(12) United States Patent
Itoh et al.

(10) Patent No.: US 6,409,000 B1
(45) Date of Patent: Jun. 25, 2002

(54) TWO-WAY CLUTCH AND ROTATION TRANSMISSION DEVICE

(75) Inventors: Kenichiro Itoh; Isao Hori, both of Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/585,618

(22) Filed: Jun. 2, 2000

(30) Foreign Application Priority Data

Jun. 3, 1999 (JP) .......................................... 11-156781
Jun. 4, 1999 (JP) .......................................... 11-157665
Sep. 8, 1999 (JP) .......................................... 11-254281

(51) Int. Cl.[7] .................... B60K 17/02; B60K 23/08; F16D 27/05
(52) U.S. Cl. ................... 192/39; 192/40; 192/71; 192/69.42; 192/84.8; 192/90; 180/247
(58) Field of Search ................. 192/39, 71, 69.4, 192/69.42, 84.8, 40, 90, 84.1, 84.6, 84.7; 180/247

(56) References Cited

U.S. PATENT DOCUMENTS 4,261,453 A * 4/1981 Kunze ...................... 192/56 R
4,548,304 A * 10/1985 Nagata ........................ 192/46
4,960,010 A * 10/1990 Muller et al. .................. 192/71

* cited by examiner

Primary Examiner—Saul Rodriguez
(74) Attorney, Agent, or Firm—Wenderoth, Lind & Ponack, L.L.P.

(57) ABSTRACT

A two-way clutch is provided which comprises an inner member formed with a plurality of pockets opening toward its outer peripheral surface, an outer member mounted on the inner member and formed with a plurality of pockets opening toward its inner peripheral surface, a cam ring formed with a cam surface on its inner peripheral surface, a plurality of block members received in the pockets of the inner member so as to protrude in a diametric direction, a plurality of resilient members received in the pockets of the inner member for biasing the block members radially outwardly, and a switch spring mounted to the inner member for maintaining a predetermined phase of the cam ring relative to the inner ring. With this construction, the inner and outer members can be engaged through the block members to transmit power by aligning the pockets of the inner and outer members with each other and by controlling the phase of the cam ring. Also, a rotation transmission device is provided which includes a first rotary member, a second rotary member, the above-described two-way clutch, and an electromagnetic clutch.

66 Claims, 15 Drawing Sheets

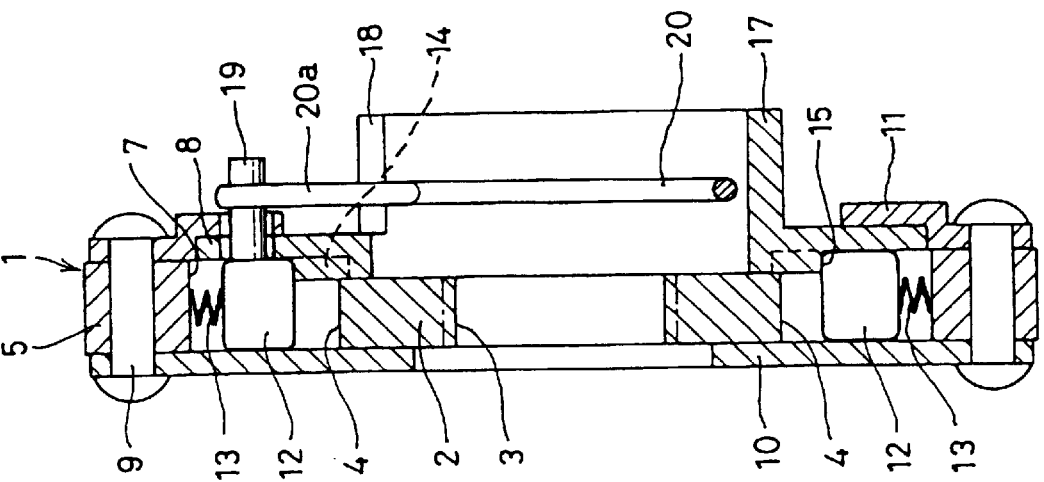
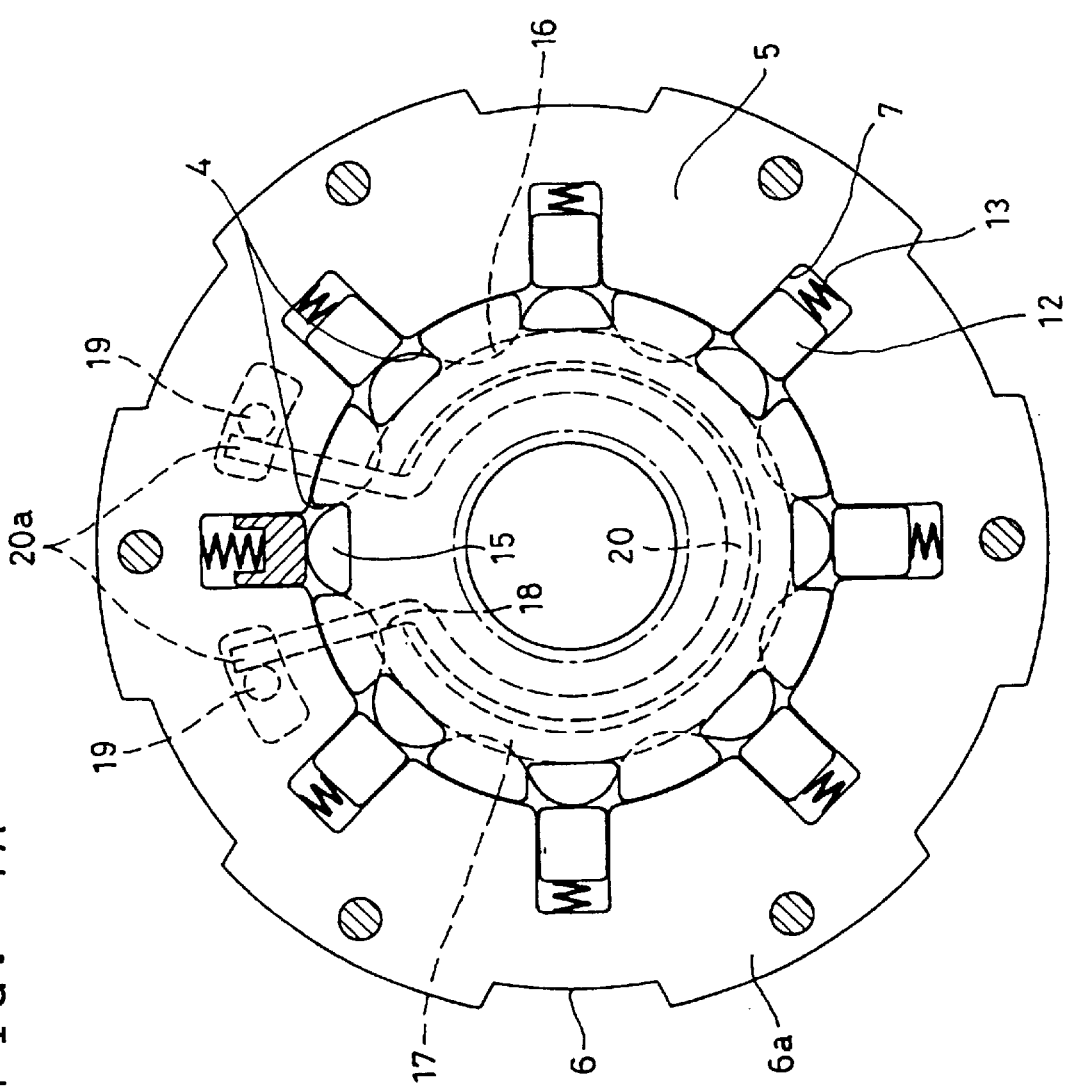
FIG. 4B
FIG. 4A

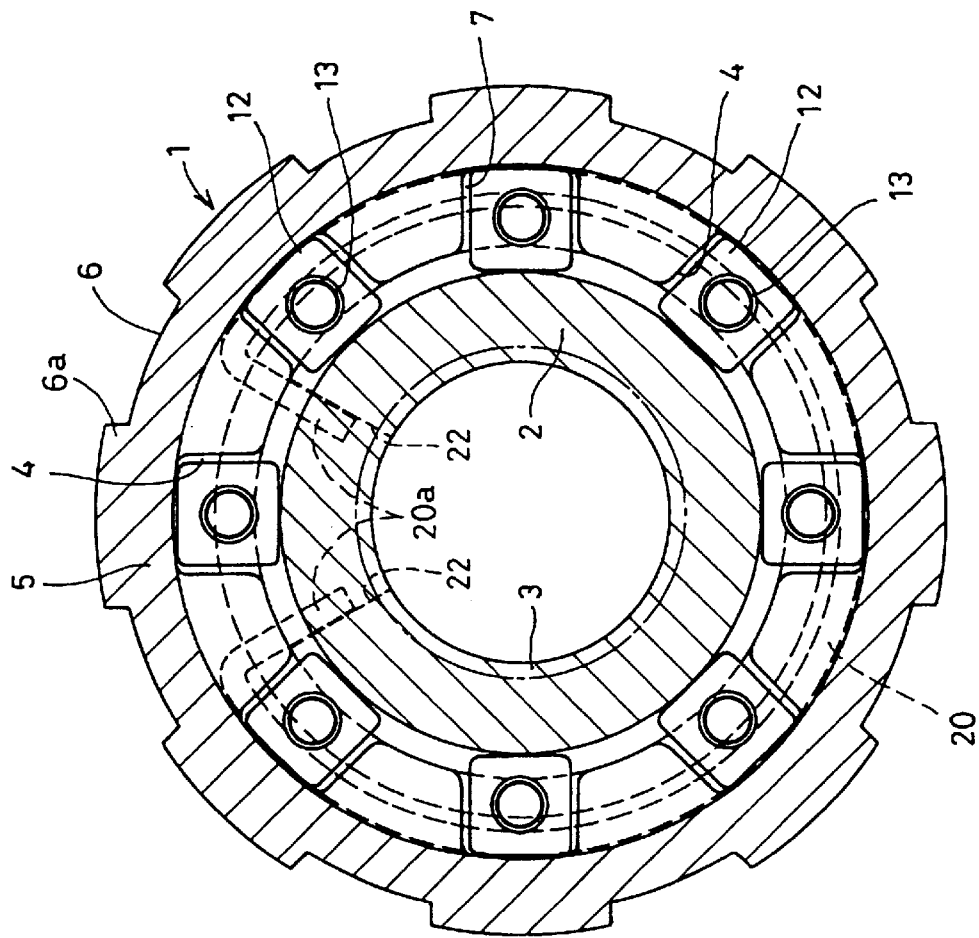
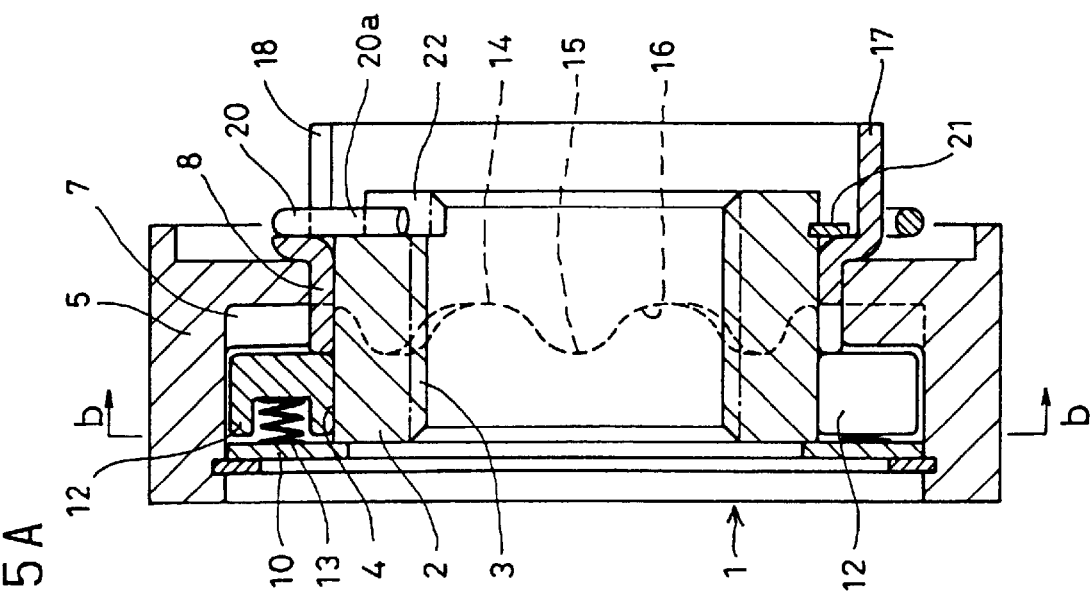
FIG. 5A
FIG. 5B

TWO-WAY CLUTCH AND ROTATION TRANSMISSION DEVICE

BACKGROUND OF THE INVENTION

This invention relates to a two-way clutch for selectively transmitting power, and a rotatation transmission device comprising the two-way clutch and an electromagnetic clutch for selectively engaging and disengaging the two-way clutch. The rotation transmission device is mounted e.g. on the power train of a four-wheel drive vehicle of the front-engine-rear-drive type to selectively transmit the engine power to the front wheel.

Such a two-way clutch comprises an inner ring, an outer ring and engaging elements in the form or rollers or sprags disposed between the inner and outer rings. If the engaging elements are rollers, ramps are formed on one of the inner surface of the outer ring and the outer surface of the inner ring to define wedge spaces between the inner and outer rings so that the inner and outer rings can be selectively locked and unlocked by moving the rollers into narrow and wide or neutral portions of the wedge spaces. If the engaging elements are sprags, the sprags are disposed between cylindrical surfaces of the inner and outer rings. By inclining or erecting the sprags, the inner and outer rings are selectively locked together or unlocked.

The electromagnetic clutch in the transmission device selectively engages and disengages the two-way clutch. If the rotation transmission device is used in an FR-based four-wheel drive vehicle, engine power can be selectively delivered to the front wheels by engaging the two-way clutch by activating the electromagnet of the electromagnetic clutch, as disclosed in Japanese patent publication 10-211828 filed by the applicant of the present invention.

With this arrangement, the front wheels can be cut off from the engine simply by turning off the electromagnetic clutch. Thus, tight corner braking in a part-time 4WD vehicle can be avoided simply by turning off the electromagnetic clutch while the vehicle is turning a tight corner.

Such conventional two-way clutches need rather thick inner and outer rings for sufficient rigidity and torque transmission capacity. The entire clutch is thus relatively heavy and costly.

An object of the invention is to provide a two-way clutch that has major components which can be formed by pressing, and is lightweight, less costly and high in torque transmission capacity.

Another objection of the invention is to provide a rotation transmission device including such a two-way clutch.

SUMMARY OF THE INVENTION

According to the present invention, there is provided a two-way clutch comprising a first member and a second member mounted on the first member. The first member is formed with a plurality of pockets in an outer periphery thereof, and the second member is formed with a plurality of pockets in an inner periphery thereof. A plurality of block members and a plurality of resilient members are received in the respective pockets of the first member, with the resilient members biasing the block members toward the second member. And a cam ring is provided adjacent to the second member and formed with a cam surface facing the pockets of the first member for controlling the protrusion and retraction of the block members.

According to the present invention, there is also provided a rotation transmission device comprising a first rotary member, a second rotary member, a two-way clutch, and an electromagnetic clutch having an armature and a rotor coupled to the second rotary member. The two-way clutch comprises a first member coupled to the first rotary member and a second member mounted on the first member. The first member is formed with a plurality of pockets in an outer periphery thereof, and the second member is formed with a plurality of pockets in an inner periphery thereof. A plurality of block members and a plurality of resilient members are received in the respective pockets of the first member, with the resilient members biasing the block members toward the second member. And, a cam ring is provided adjacent to the second member and formed with a cam surface facing the pockets of the first member for controlling the protrusion and retraction of the block members. The cam ring is engagable with and disengagable from the rotor in response to an external signal delivered to the electromagnetic clutch.

BRIEF DESCRIPTION OF THE DRAWINGS

FIG. 4A is a front view showing a second embodiment of the two-way clutch;

FIG. 4B is a vertical sectional view of the same;

FIG. 5A is a vertical sectional view showing a third embodiment of the two-way clutch;

FIG. 5B is a vertical sectional front view taken along line b—b of FIG. 5A;

DETAILED DESCRIPTION OF THE PREFERRED EMBODIMENTS

Figure 1:
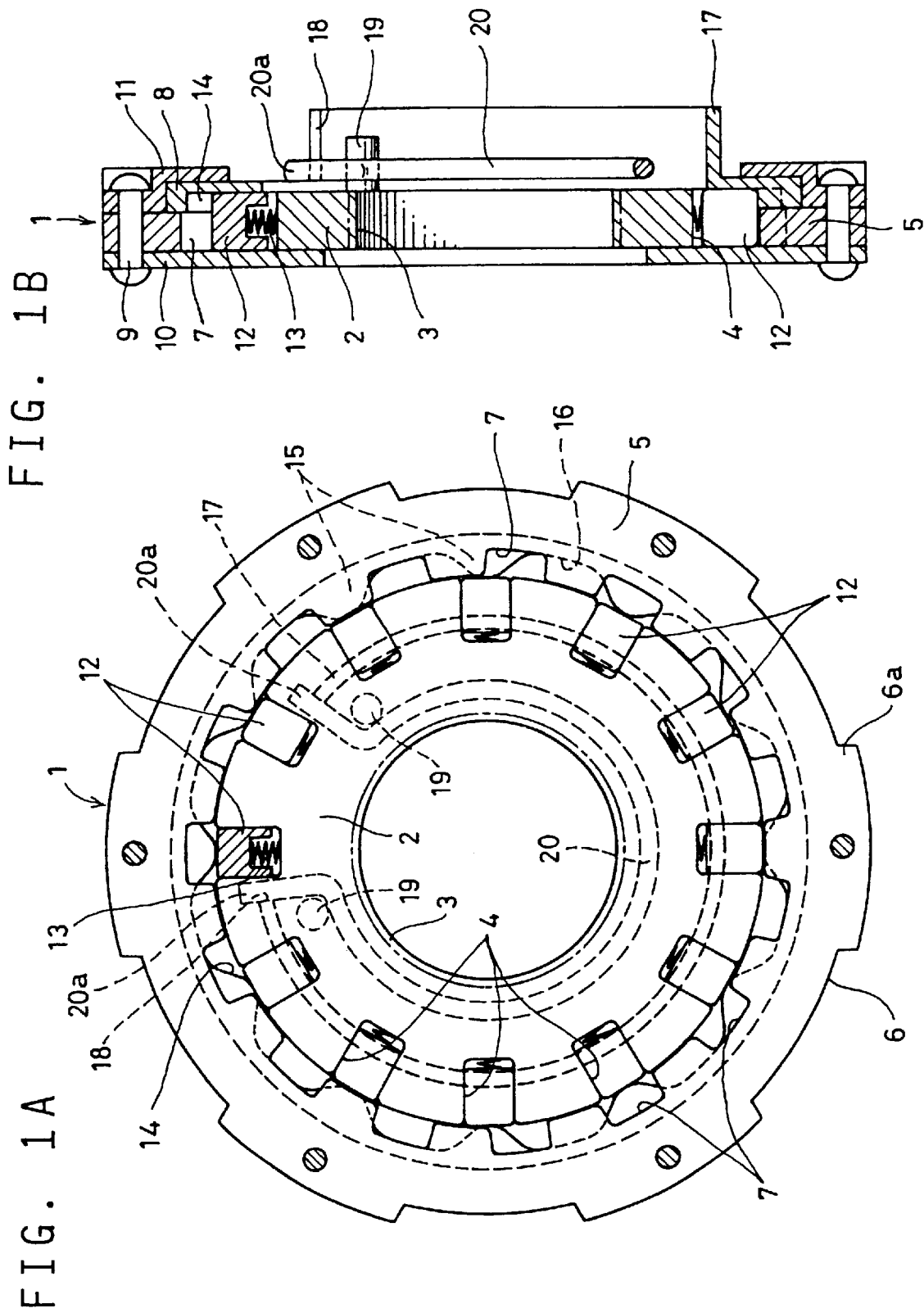
FIG. 1A is a front view showing a first embodiment of a two-way clutch.
FIG. 1B is a vertical sectional view of the same.
Figure 2:
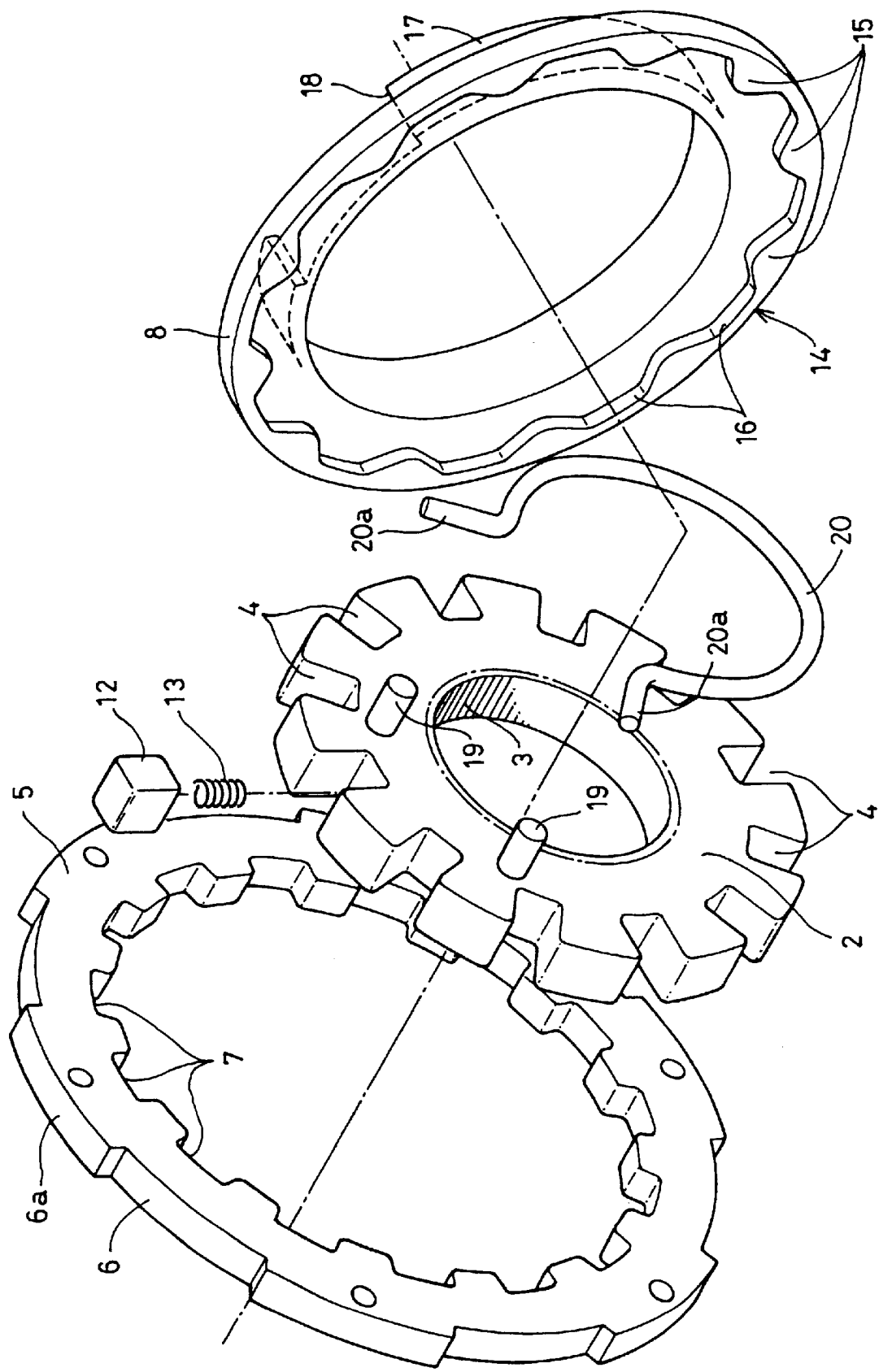
FIG. 2 is an exploded perspective view of the same.

First, the first embodiment of the two-way clutch shown in FIGS. 1A–3B includes an inner ring 2 as an inner member adapted to be nonrotatably coupled to e.g. a shaft through splines 3 formed on its inner periphery. The inner ring 2 is formed with a plurality of pockets 4 on its outer surface at equal circumferential intervals.

The clutch further includes an outer ring 5 as an outer member rotatably mounted around the inner ring 2 and adapted to be nonrotatably coupled to a rotary flange or casing through slits 6 and protrusions 6a formed an on outer surface thereof. A plurality of pockets 7 are formed in the inner surface of the outer ring 5 at equal angular intervals.

The outer ring 5 has a slightly smaller (axial) thickness than the inner ring 2 and partially surrounds the outer surface of the inner ring 2, except its narrow strip area including one edge thereof. A cam ring 8 is mounted on the inner ring 2 along the one edge so as to surround the narrow strip area of the outer surface of the inner ring 2. The outer ring 5 and the cam ring 8 are retained between side plates 10 and 11 coupled together by rivets 9 so as to be rotatable relative to each other. The inner ring 2 is rotatably retained between the side plate 10 and the cam ring 8.

In each pocket 4 of the inner ring 2, a block member 12 and a resilient member 13 such as a spring are received. The spring 13 biases the block member 12 radially outwardly. The block member 12 is of such a size that it is completely retracted into the pocket 4 when the spring 13 is fully compressed, as shown in FIG. 1A, and is adapted to extend partially into the corresponding pocket 7 of the outer ring 5 when it protrudes under the bias of the spring.

The pockets 7 of the outer ring 5 are slightly wider (in the circumferential direction) than the pockets 4 of the inner ring 2 so that the block members 12 can engage in the pockets 7 of the outer ring 5 smoothly and quickly. This increases the response of engagement and disengagement.

Since the inner ring 2, outer ring 5, cam ring 8 and side plates 10 and 11 can be formed by pressing, the two-way clutch 1 can be manufactured at a low cost and is lightweight.

The cam ring 8 has a shallow recess defined by a shoulder surrounding the narrow strip area of the outer surface of the inner ring 2. The inner surface of the shoulder of the cam ring 8 functions as a cam surface 14.

The cam surface 14 (FIG. 2) comprises alternating lobes 15 and recesses 16 connected with each other through a ramp. The lobes 15 are of the same number and provided at the same angular intervals as are the pockets 4 of the inner ring 2. Thus, when the cam ring 8 is at such an angular position relative to the inner ring 2 that the lobes 15 align with the pockets 4, the lobes push the block members 12 completely into the pockets 4.

The cam ring 8 has an integral cylindrical extension 17 formed with a cutout 18. The inner ring 2 has two pins 19 (FIG. 2) protruding axially from its one side facing the cam ring and angularly spaced from each other by a distance substantially equal to the circumferential width of the cutout 18. A switch spring 20 having substantially the shape of the letter C has its bent ends 20a engaging both edges of the cutout 18 and the pins 19 in a deflected state to keep the cam ring 8 and inner ring 2 from turning relative to each other.

The lobes 15 of the cam ring 8 are so arranged as to align with the respective pockets 4 of the inner ring 2 to keep the block members 12 completely retracted in the pockets 4 when the bent ends 20a of the switch spring 20 are both in engagement with the side walls of the cutout 18. In this state, there is a slight gap between each block member 12 and the outer ring 5, so that the inner and outer rings 2,5 are rotatable relative to each other.

In the embodiment of FIGS. 1A to 3A, the pockets 4 of the inner ring 2 and the pockets 7 of the outer ring 5 are of different numbers relative to each other. With this arrangement, as will be apparent from FIG. 3A, some of the pockets 7 of the outer ring 5 are always aligned or almost aligned with some of the pockets 4 of the inner ring 2, so that when the lobes 15 disengage from the block members 12, some of the block members including the shaded one (FIG. 1A) instantly engage in pockets 7. The inner and outer rings are thus locked together.

Figure 3A:
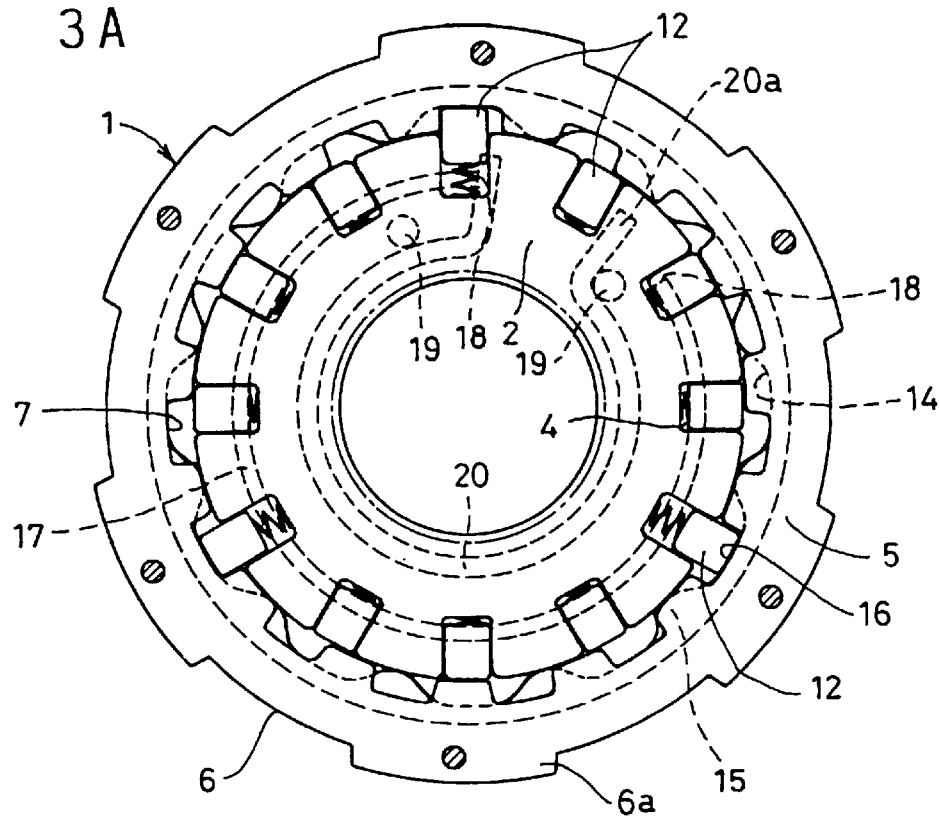
FIG. 3A is a front view showing the inner and outer rings in the first embodiment of the two-way clutch in a locked state.
Figure 3B:
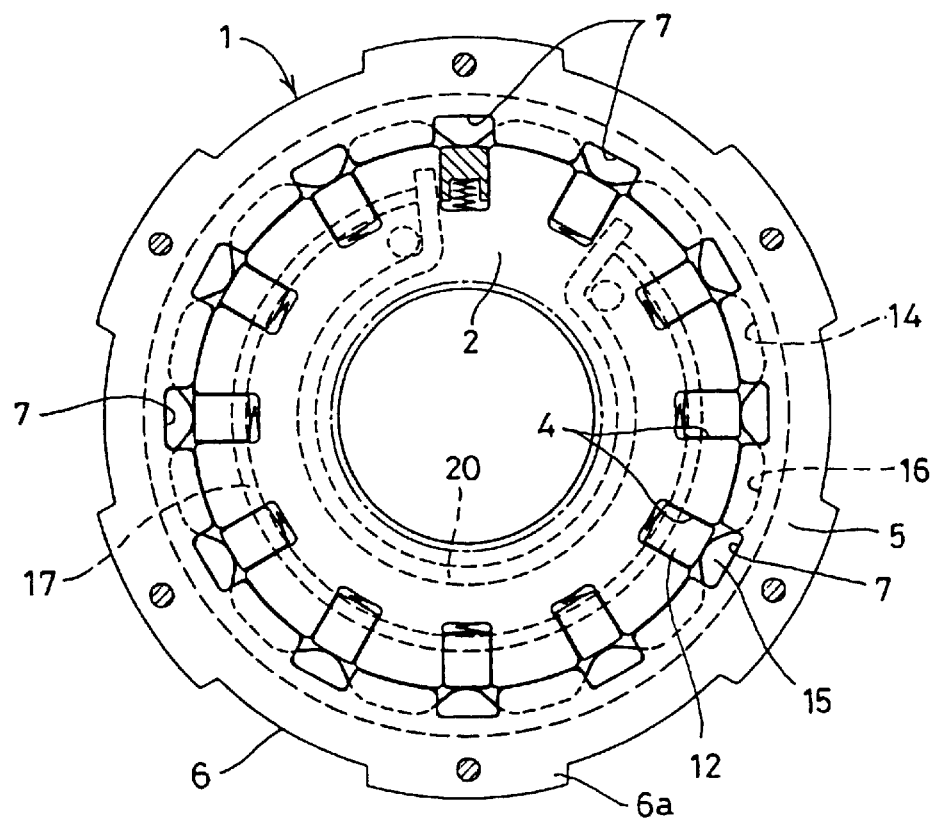
FIG. 3B is a front view showing a modified embodiment in which the numbers of pockets in the inner and outer rings are equal to each other.

In the modified embodiment of FIG. 3B, the pockets 4 and 7 are equal in number, so that all the block members 12 engage in the pockets 7 of the outer ring 5 all at once. Larger torque can thus be transmitted between the inner and outer rings.

Now in operation, when the outer ring 5 is turning and the inner ring 2 is stationary with no turning force applied to the cam ring 8, the cam ring is kept stationary because it is coupled to the inner ring 2 through the switch spring 20. Since the block members 12 are all retracted into the pockets 4 by the lobes 15 of the cam ring 8, the inner ring 2 remains stationary with only the outer ring 5 rotating.

When a turning force greater than the force of the switch spring 20 is applied to the cam ring 8 in this state, the cam ring 8 will turn in one direction relative to the inner ring 2 against the force of the spring 20 as shown e.g. in FIG. 3A. Thus, some of the block members 12 will be disengaged from the lobes 15 of the cam ring 8 and partially extend into the respective pockets 7 of the rotating outer ring 5 under the bias of the resilient member 13, thereby locking the inner and outer rings together. The inner ring 2 thus begins to rotate together with the outer ring 5.

In the engaged position, some or all of the block members 12 partially extend into the pockets 7 of the outer ring 5 and partially in the pockets 4 of the inner ring 2. Thus, in this state, the inner and outer rings cannot rotate relative to each other without destroying the block members 12. The block members are practically undestroyable though. Thus, large torque can be transmitted between the inner and outer rings even if the block members are small in number and size. This makes it possible to reduce the size of the entire clutch. The fact that all the elements of the clutch can be manufactured by pressing will also contribute to a reduced size of the clutch.

In the engaged state, when the turning force applied to the cam ring 8 is removed, it returns to the position of FIG. 1A under the force of the switch spring 20. The lobes 15 of the cam ring 8 thus push all the block members 12 into the pockets 4, thus disengaging the inner and outer rings from each other. The inner ring 2 thus stops while the outer ring 5 keeps rotating.

Thus, the inner and outer rings 2 and 5 are selectively locked together and disengaged from each other by rotating the cam ring 8 relative to the inner ring 2.

FIGS. 4A and 4B show a second embodiment. In this and the subsequent embodiments, like elements are denoted by like numerals and not described again.

In the second embodiment, a block member 12 and a resilient member such as a spring 13 are received in each pocket 7 of the outer ring 5. The spring 13 biases the block member 12 radially inwardly. The block member 12 is sized such that it is completely retracted into the pocket 7 when the spring 13 is compressed, and is adapted to extend partially into the corresponding pocket 4 of the inner ring 2.

The inner ring 2 has a slightly smaller (axial) thickness than the outer ring 5 and is rotatably received in the outer ring so as to oppose the inner surface of the outer ring. The cam ring 8 has an annular protrusion having an axial length substantially equal to the difference in thickness between the inner ring 2 and the outer ring 5 and received in the outer ring. The annular protrusion has an outer cam surface 14 having as many lobes 15 as the pockets 7 of the outer ring 5 and is opposed to the inner surface of the outer ring 5.

In this embodiment, the inner and outer rings 2 and 5 are selectively locked together and disengaged from each other by rotating the cam ring 8 relative to the outer ring 5.

As in the first embodiment, the number of the pockets 4 and pockets 7 may be equal to each other as shown, or may be different from each other so that some of the pockets 4 always align with some of the pockets 7.

FIGS. 5A and 5B show a third embodiment in which the pockets 4 and 7 are arranged so as to axially align with each other, and the block members 12 move axially between the pockets 4 and 7 for selective engagement and disengagement between the inner and outer rings 2, 5.

Specifically, the inner ring 2 of this embodiment is of an L-shape section and has a radially outwardly protruding flange formed with a plurality of pockets 4 extending axially therethrough and arranged at equal angular intervals. The outer ring 5, too, is of an L-shape section and has a radially inwardly protruding flange axially opposite to the flange of the inner ring 2 and formed with a plurality of axial pockets 7 having inner openings and adapted to axially align with the pockets 4. The flange of the inner ring 2 is retained between a side plate 10 fastened to the inner surface of the outer ring 5 and the flange of the outer ring.

A block member 12 and a resilient member such as a spring 13 are received in each pocket 4 of the inner ring 2. The spring 13 biases the block member 12 axially toward the flange of the outer ring 5. The block member 12 is sized such that it is completely retracted into the pocket 4 when the spring 13 is fully compressed, and is adapted to protrude partially into the pocket 7 of the outer ring 5.

The cam ring 8 is a cylindrical member rotatably received between the radially inner end of the flange of the outer ring 5 and the outer cylindrical surface of the inner ring 2 and is prevented from being axially removed by a snap ring 21 fitted on the outer peripheral surface of the inner ring 2. A cam surface 14 having as many cam lobes 15 as there are pockets 4 of the inner ring 2 is formed on the inner axial end of the cam ring 8. The cam ring further includes an integral cylindrical extension 17 formed on its axial outer side and having a sector-shaped cutout 18. The inner ring 2 is formed with a sector-shaped cutout 22 at its axial end so as to radially align with the cutout 18. A switch spring 20 is mounted around the extension 17, and is deflected to engage its bent ends 20a in the cutouts 18 and 22.

When the cutouts 18 and 22 are aligned with each other (FIG. 5B), the block members 15 are completely retracted into the pockets 4 of the inner ring 2 by the cam lobes 15 of the cam ring 8. The inner and outer rings 2 and 5 are thus uncoupled from each other.

When the cam ring 8 is rotated relative to the inner ring 2 from the position of FIG. 5B against the force of the spring 20, the cam lobes 15 will disengage from the block members 12, so that the block members are partially pushed into the pockets 7 of the outer ring 5 by the springs 13. The inner and outer rings 2 and 5 are thus coupled together and rotate in unison.

Since the pockets 4 and 7 are arranged to axially oppose each other, the radial dimension of the clutch 1 can be reduced into a compact unit.

Figure 6:
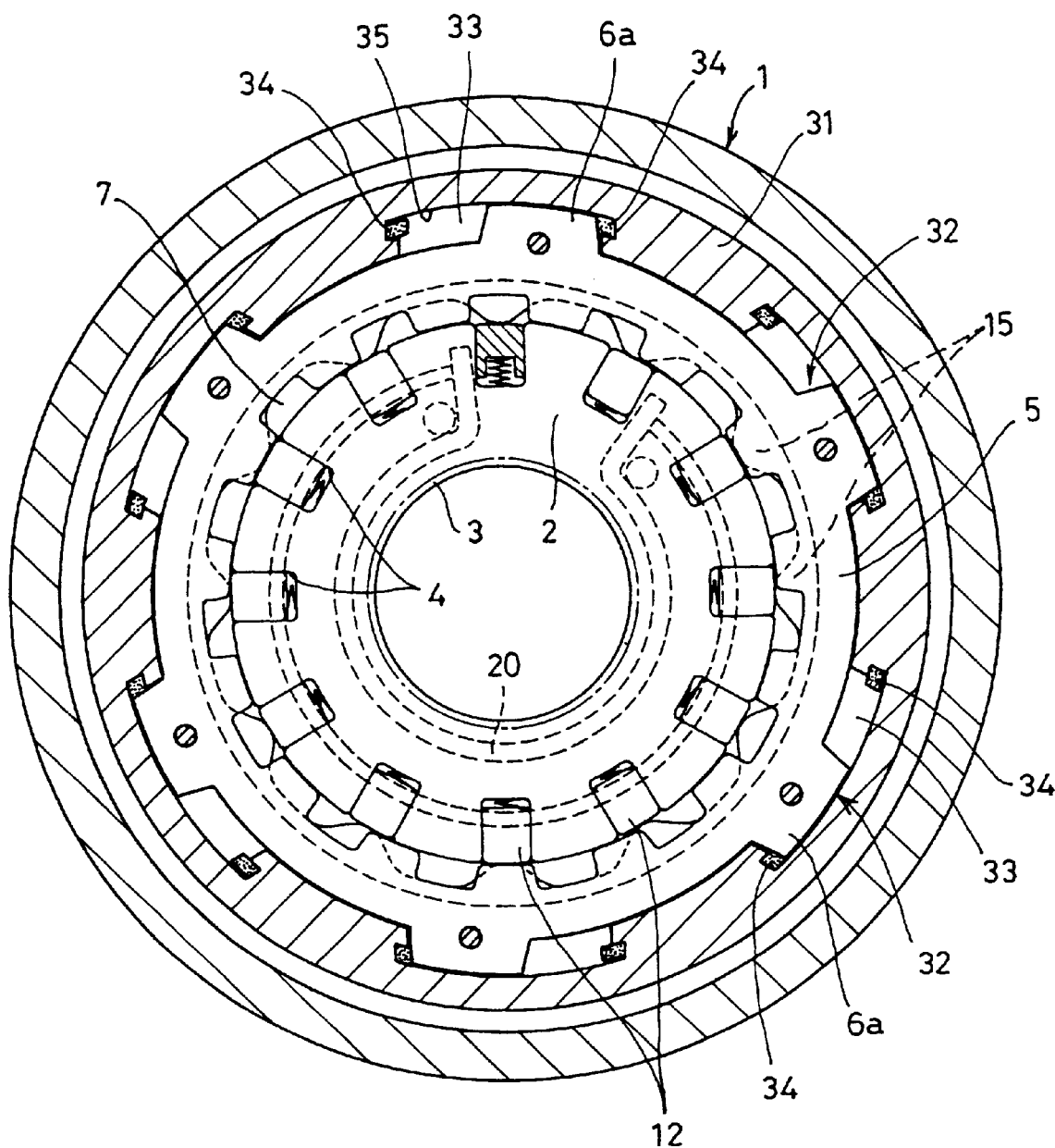
FIG. 6 is a front view showing a fourth embodiment of the two-way clutch.

FIG. 6 shows the fourth embodiment of the two-way clutch 1. In the two-way clutch of this embodiment, a case 31 is rotatably mounted on the outer ring 5, and a plurality of torque transmitting portions 32 are provided at an engaging portion between the outer ring 5 and the case 31. Gaps 33 extending in the rotational direction of the outer ring 5 are formed in the torque transmitting portions 32. Resilient members 34 are provided at both ends of each torque transmitting portion 32 in the rotational direction.

With the torque transmitting portions 32, recesses 35 are formed in the inner surface of the case 31 to receive the protrusions 6a of the outer ring 5 and the width of the recesses 35 along the circumferential direction are set to be wider than the protrusions 6a to form the gaps 33 in the recesses 35 in the rotational direction to permit relative rotation between the outer ring 5 and the case 31.

Figure 7:
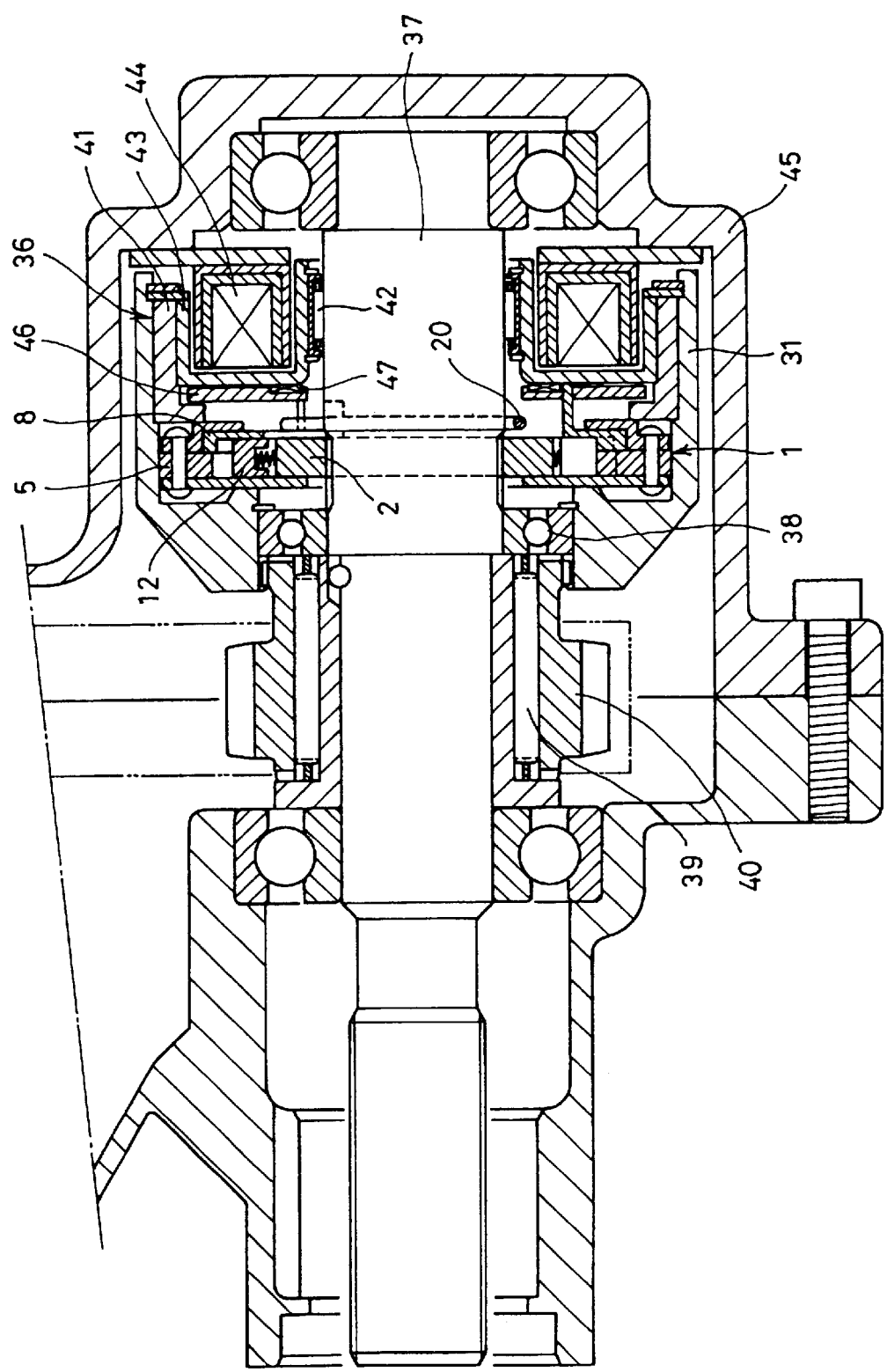
FIG. 7 is a vertical sectional front view showing an arrangement in which the two-way clutch of the fourth embodiment is used as an on-demand device of a four-wheel drive vehicle.

FIG. 7 shows an arrangement in which an electromagnetic clutch 36 is combined with the two-way clutch 1 of the fourth embodiment for use as an on-demand device of a four-wheel drive vehicle.

In FIG. 7, the two-way clutch 1 is mounted on an output shaft 37 of a transfer connected to a front wheel axle. The inner ring 2 is coupled to the output shaft 37 so as to integrally rotate, the case 31 mounted on the outer ring 5 is rotatably supported by the output shaft 37 through a bearing 38, and an input gear 40 rotatably mounted on the output shaft 37 through a bearing 39 and the case 31 are coupled together so as to integrally rotate.

The electromagnetic clutch 36 mounted between the output shaft 37 and the case 31 has a rotor 43 mounted in a rotor guide 41 pressed into the case 31 and rotatably supported by the output shaft 37 through a bearing 42. An electromagnetic coil 44 housed in the rotor 43 is mounted in a case 45 of the transfer. An armature 46 is arranged between the opposed surfaces of the rotor 43 and the two-way clutch 1 so as to be rotatable and axially movable. The armature 46 is biased by a corrugated spring 47 away from the rotor 43. The cam ring 8 of the two-way clutch 1 and the armature 46 are coupled so as to be integrally rotatable and axially movable.

The cam ring 8 of the two-way clutch 1 is held by the switch spring 20 in such a phase that each cam lobe 15 faces the block member 12.

When the four-wheel vehicle runs in an auto-mode with the electromagnetic switch OFF, the output shaft 37 rotates at the same speed as the input gear 40 and the case 31 coupled thereto, and the rotor guide 41 and the rotor 43 rotate integrally, so that due to the function of the switch spring 20 the block members 12 are pushed into the pockets 4 of the inner ring 2 by the cam lobes 15 of the cam ring 8. Thus the coupling of the outer ring 5 and the inner ring 2 is released.

When the rear wheels of the vehicle slip in this state, the electromagnetic coil 44 will be energized, so that by the electromagnetic coil 44, the armature 46 is attracted to the rotor 43. Thus the rotation of the rotor 43 is transmitted to the cam ring 8 through the armature 46, so that the cam ring turns against the force of the switch spring 20. Now each cam lobe 15 separates from the block member 12 to release it. The block members 12 thus extend from the pockets 4 and are received within the pockets 7 of the outer ring 5. Thus the outer ring 5 and inner ring 2 are coupled together, and the rotation of the outer ring 5 is transmitted to the output shaft 37 through the inner ring 2, so that the four-wheel drive state in which the front and rear wheels are driven is reached.

Figure 8:
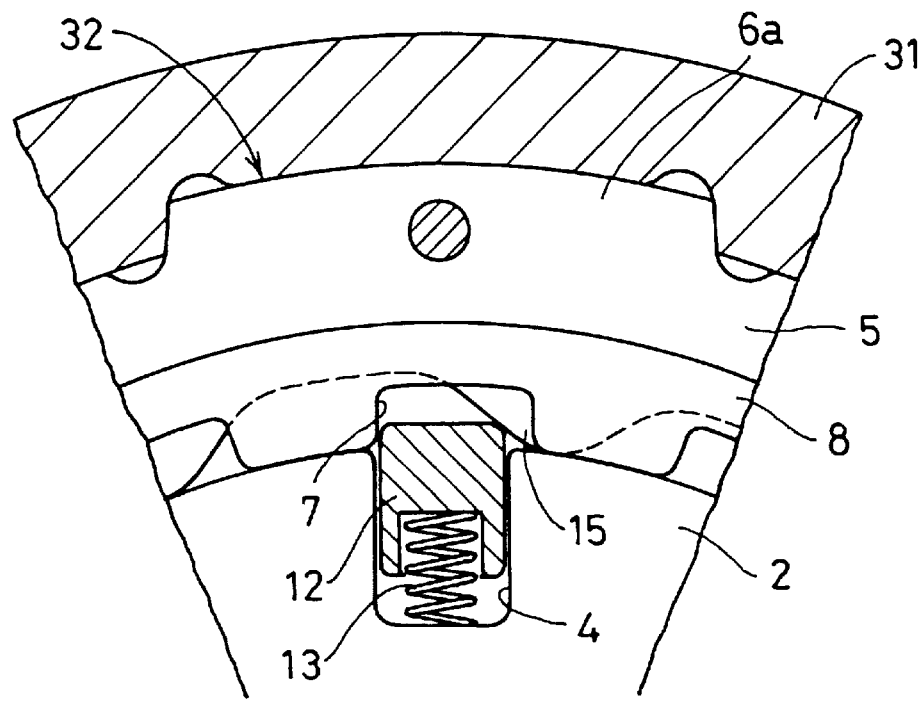
FIG. 8 is a partial enlarged front view showing an arrangement of the two-way clutch in which the outer ring and the case are directly coupled together.

According to the positional relationship between the pockets 7 of the outer ring 5 and the pockets 4 of the inner ring 2 within a certain range when the electromagnetic coil 44 is energized, the movement of the cam ring 8 is slight as shown in FIG. 8, so that there may be a case in which the protrusion of the block members 12 into the pockets 7 of the outer ring 5 is shallow. Thus, as shown in FIG. 8, in a structure in which the outer ring 5 and the case 31 are directly coupled so as to rotate integrally, if there are torque variations or vibrations while running, the block members 12 in the pockets 7 of the outer ring 5 may become removed therefrom.

In contrast, in the fourth embodiment, since the gaps 33 in the rotational direction are set in the torque transmitting portions 32 between the outer ring 5 and the case 31, and the resilient members 34 are provided at both ends of the torque transmitting portions 32, the outer ring 5 can rotate relative to the case 31 and the cam ring 8 by the distance equal to the size of the gaps 33 even after the case 31 and cam ring 8 have been locked together by the electromagnetic clutch. Thus, even if the block members 12 should engage in an incomplete manner as shown in FIG. 8, the outer ring will be pushed leftwardly in the figure by the force of the springs 13 until the block members 12 engage deeply into the pockets 7.

During travelling in which forward and backward travels are repeated, since the case 31 and the rotor 43 are integral, when the electromagnetic coil 44 is energized, the armature 46 becomes integral with the rotor 43. Thus, although the cam ring 8 begins to rotate, since there are the gaps 33 between the outer ring 5 and the case 31, the outer ring 5 will not start to turn until the gaps 33 disappear. Thus, even when the cam lobes 15 of the cam ring 8 disengage, the block members 12 do not protrude into the pockets 7 of the outer ring 5.

When the gaps 33 in the torque transmitting portions 32 disappear, the outer ring 5 rotates. When the phases of the pockets 7 of the outer ring 5 and the pockets 4 of the inner ring 2 coincide, since the cam lobes 15 of the cam ring 8 are completely separate from the block members 12, the block members 12 spring out of the pockets 4 of the inner ring 2 and extend into the pockets 7 of the outer ring 5. Now the outer ring 5 and the inner ring 2 are coupled together, so that even if there are torque variations or vibrations while running, there will be no possibility of the block members 12 separating from the pockets 7 of the outer ring 5. This is effective during running in which forward and backward travels are repeated.

Figure 9:
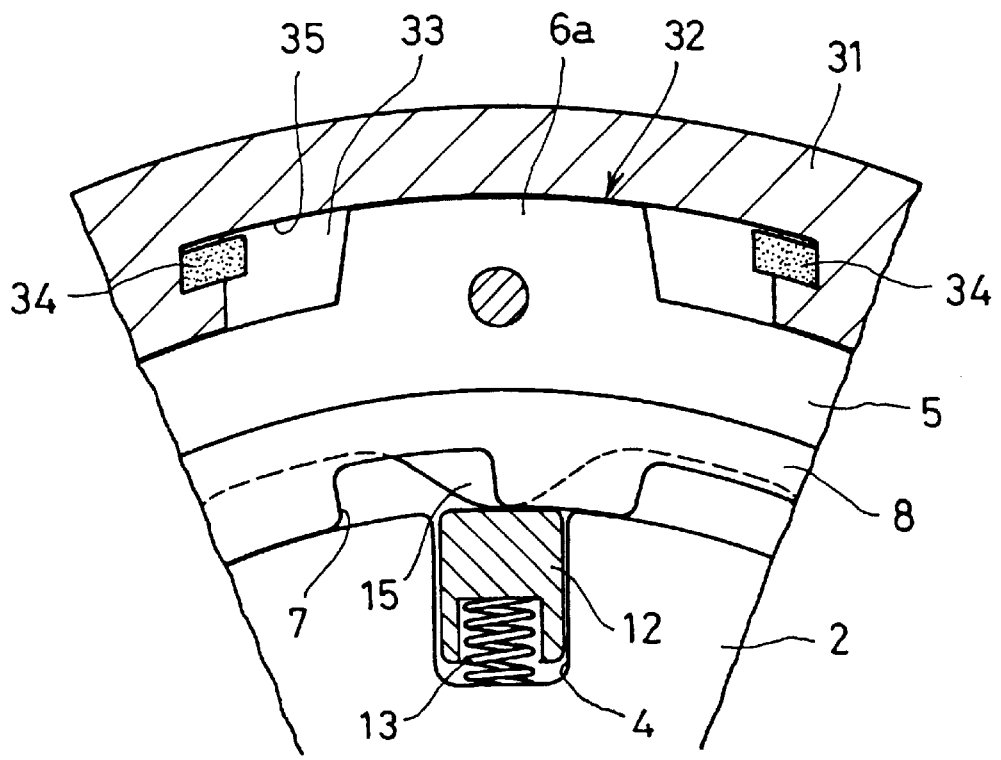
FIG. 9 is a partial enlarged front view of a torque transmitting portion in which the two-way clutch of the fourth embodiment in employed.

But when forward and backward travels are repeated discontinuously, the gaps 33 in the torque transmitting portions 32 do not function effectively. Since in this embodiment the resilient members 34 are mounted at both ends of the torque transmitting portions 32, when the block members 12 become removed from the pockets 7 of the outer ring 5 and the coupling between the outer ring 5 and the inner ring 2 are released, due to the resilience of the resilient members 34, the protrusions 6a of the outer ring 5 are pushed, so that it is possible to maintain the gaps in the torque transmitting portions 32 as shown in FIG. 9.

Incidentally, while the fourth embodiment is illustrated using the two-way clutch of the first embodiment, its effect is the same even if the two-way clutch of the second or third embodiment is used.

Figure 10:
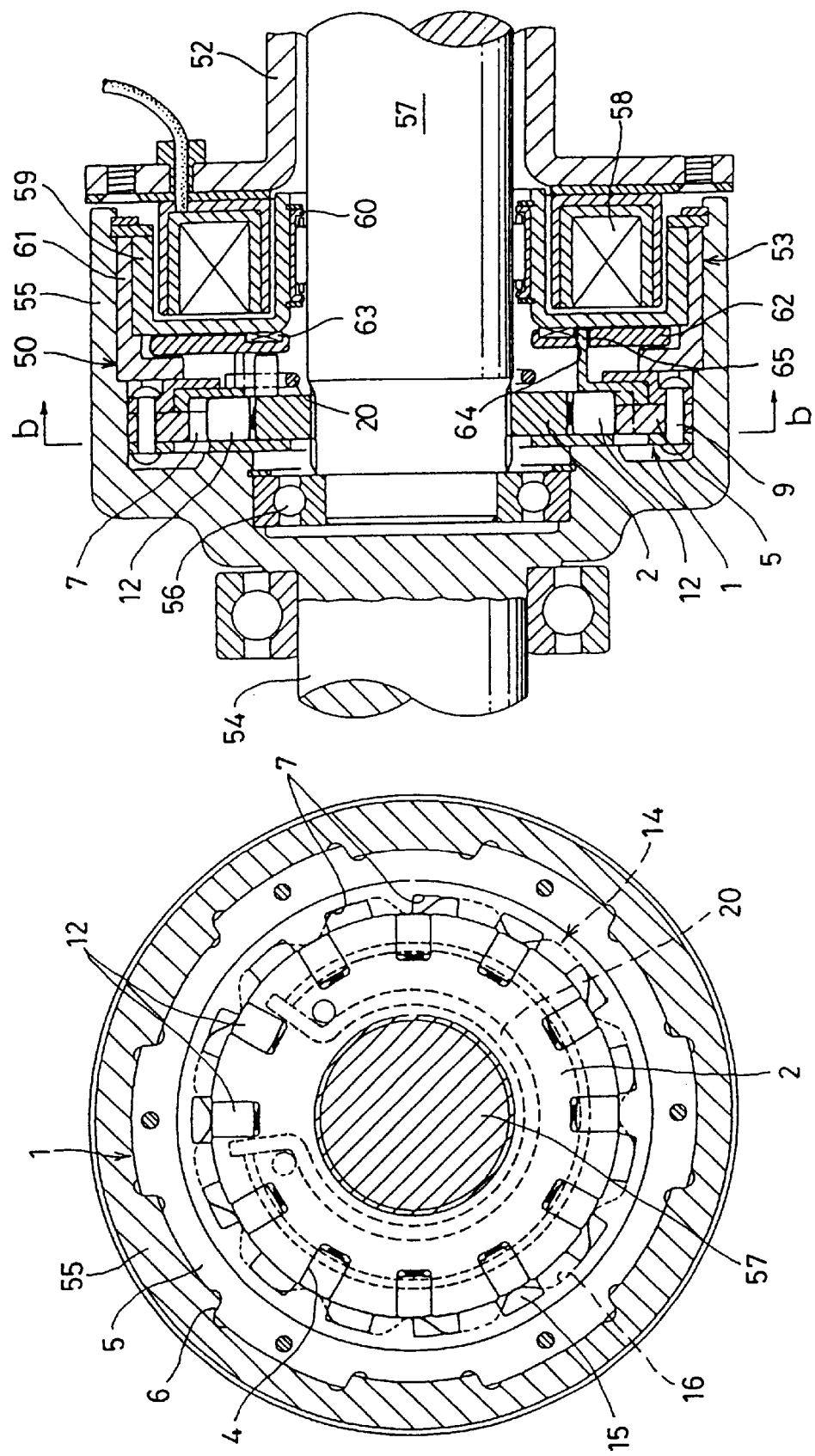
FIG. 10A is a vertical sectional view of a rotation transmission device embodying the invention.
FIG. 10B is a sectional view taken along line b—b of FIG. 10A.

FIGS. 10A and 10B show a first embodiment of the rotation transmission device 50 embodying the present invention, which comprises the two-way clutch 1 shown in FIGS. 1A–3A, and an electromagnetic clutch 53 provided on one side of the two-way clutch 1 for selectively locking and unlocking the two-way clutch. The rotation transmission device 50 is mounted between a cup member 55 of a rotary input shaft 54 and an output shaft 57 having its end inserted in and coaxially and rotatably supported by the cup member 55 through a bearing 56.

Since the structure and function of the two-way clutch have been described above, the description thereof is omitted.

The outer ring 5 is formed on its outer periphery with a plurality of slits 6 for coupling with the cup member 55 of the input shaft 54.

As the two-way clutch, any of the first embodiment shown in FIGS. 1A–3B, the second embodiment shown in FIGS. 4A and 4B and the third embodiment shown in FIGS. 5A and 5B may be employed.

In FIGS. 10A and 10B, the electromagnetic clutch 53 is mounted between the output shaft 57 and the cup member 55 so as to oppose one side of the two-way clutch 1 and comprises an electromagnet 58 fixed to a flange of a stationary case 52, a rotor 59 rotatably mounted around the output shaft 57 through a bearing 60 and rotatably surrounding the electromagnet 58. The rotor 59 has its outer periphery nonrotatably supported by a rotor guide 61 fixed to the cup member 55 of the input shaft 54 so as not to rotate relative to the cup member 55 and thus the rotor guide 61.

The electromagnetic clutch further includes an armature 62 disposed between the rotor 59 and a flange of the rotor guide 61 so as to be axially movable and turnable. The extension 17 of the cam ring 8 has a plurality of claws 65 engaged in holes 64 formed in the armature 62 to keep the armature 62 nonrotatable but axially movable relative to the cam ring 8. A resilient member 63 such as a corrugated spring is disposed between the armature 62 and the rotor 59 to keep the armature 62 spaced away from the rotor 59 while the electromagnet 58 is not energized.

The first embodiment of the rotation transmission device is structured as described above.

In operation, when the input shaft 54 is turning with the electromagnet 58 off and the output shaft 57 kept stationary, the armature 62 is not coupled to the rotor 59. Thus, the switch spring 20 maintains the cam ring 8 and the inner ring 2 in such a position that the block members 12 are completely retracted by the lobes 15 into the pockets 4 of the inner ring 2, thereby keeping the inner ring disengaged from the outer ring 5. The output shaft 57 thus remains stationary.

When the electromagnet 58 is energized in this state, the armature 62 is magnetically attracted toward the electromagnet 58 and pressed against the rotor 59. The friction between the rotor 59 and the armature 62 thus increases above the force of the switch spring 20, so that the cam ring 8 is rotated by the input shaft 54 through the rotor 59 (which rotates together with the input ring 2) and the armature 62 while deflecting the switch spring 20 until the lobes 15 disengage from the block members 12 to allow them to protrude into the pockets 7 of the outer ring 5. The inner and outer rings 2, 5 are thus locked together through some or all of the block members 12 in the manner as described above, and torque is transmitted from the input shaft 54 to the output shaft 57.

When the electromagnet 58 is deenergized in this state, the armature 62 separates from the rotor 59. Thus, the switch spring 20 moves the cam ring 8 back to the disengaged position, i.e. the position in which all the block members 12 are fully retracted into the pockets 4 of the inner ring 2. The inner ring thus disengages from the outer ring 5 and stops.

Figure 11:
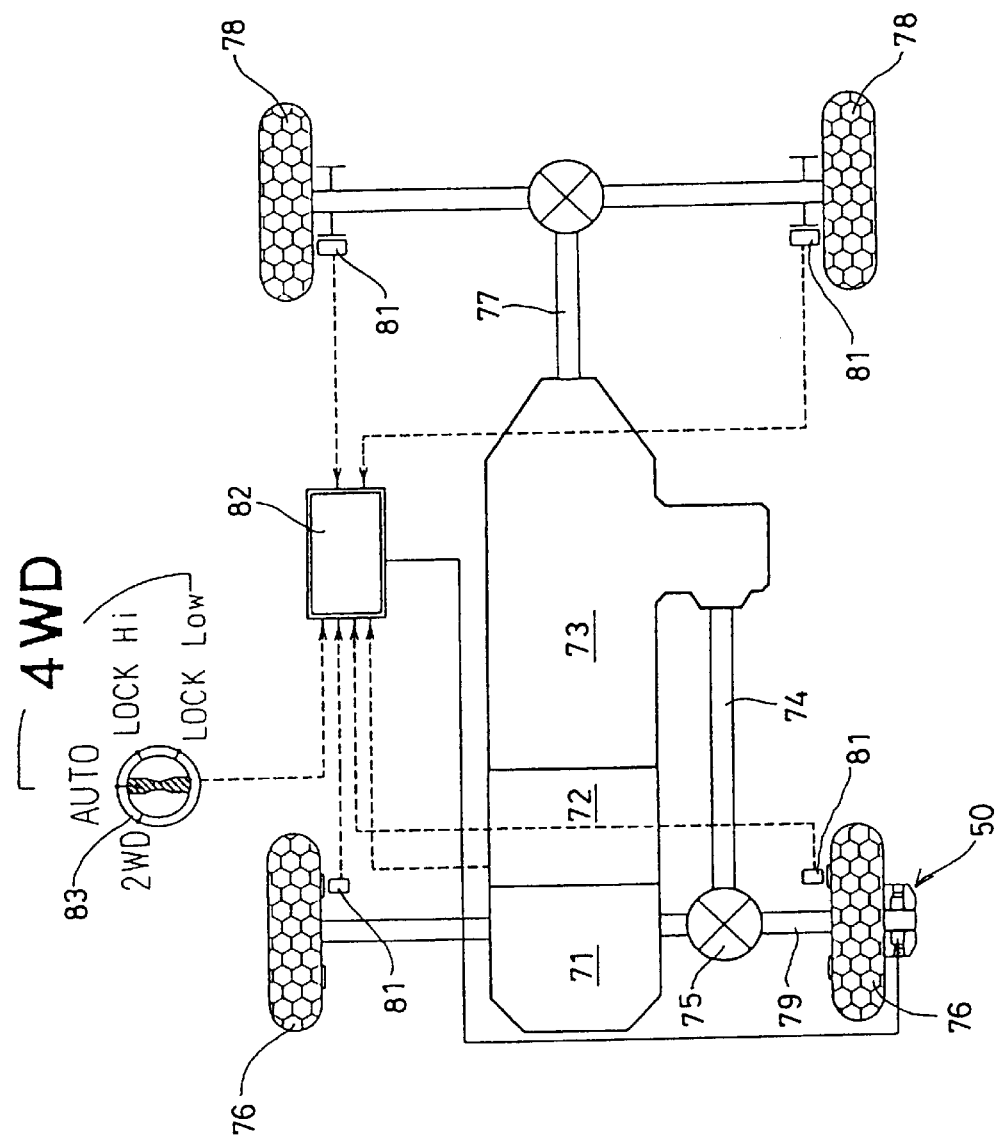
FIGS. 11, 13 and 15 are schematic plan views of the power train of a 4-wheel drive vehicle on which the rotation transmission device of FIG. 10 is mounted at various locations.
Figure 12:
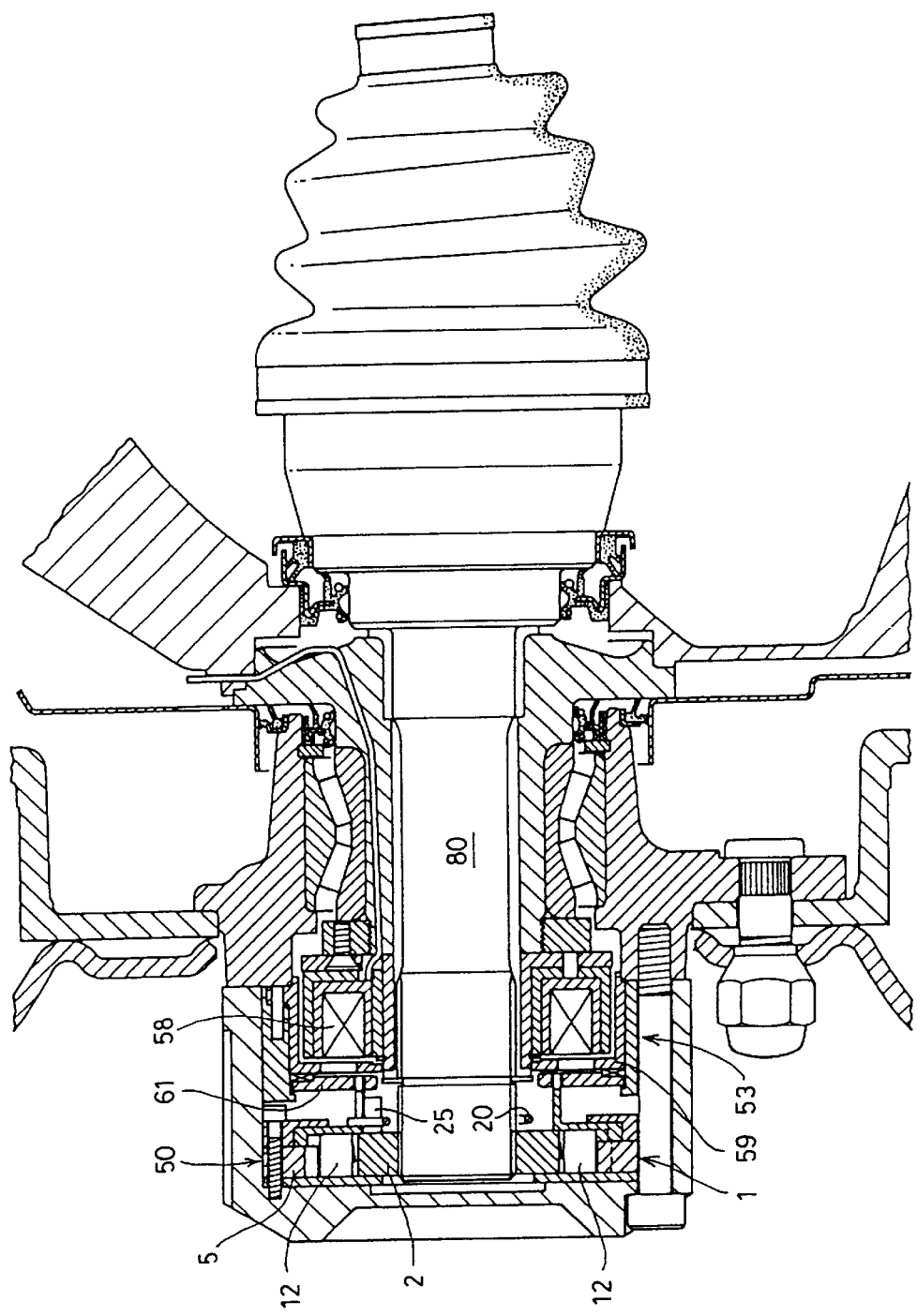
FIGS. 12, 14 and 16 are sectional views showing how the rotation transmission devices are mounted in the arrangements of FIGS. 11, 13 and 15, respectively.

FIG. 11 shows a layout showing a first example in which the rotation transmission device 50 of the first embodiment is mounted in the wheel drive line of a four-wheel drive vehicle as a rotation transmission device for the hub. FIG. 12 shows a structure of a portion in which the rotation transmission device 50 is mounted.

In FIG. 11, the output of a transfer 73 coupled to an engine 71 through a transmission 72 is transmitted to front wheels 76 through a front propeller shaft 74 and a front differential 75 and to rear wheels 78 through a rear propeller shaft 77. The rotation transmission device 50 is mounted between a stem shaft 80 of a constant-velocity joint coupled to one end of a front wheel axle 79 and one front wheel 76.

The revolving speeds of all the wheels of the four-wheel drive vehicle are detected individually by sensors 81. The detected speeds are entered into a controller (ECU) 82. The detected rotational speeds of the transmission 72 and transfer 73, as well as the signal from a mode-select switch 83, are entered into the controller 82. The controller compares the difference in the number of revolutions between the front and rear wheels 76 and 78 and a preset value and activates the rotation transmission device 50 when the number of revolutions of the rear wheels exceeds the preset value.

In the first example of the above structure, for two wheel drive (2WD) travel, when the engagement of the front wheel drive line is cut off by the transfer 73 to turn OFF a current to the electromagnet 58 of the rotation transmission device 50 not to lock the two-way clutch, the front wheel axle on the opposite side of the rotation transmission device 50 is rotated from the front wheels 76. But since the stem shaft 80 of the rotation transmission device 50 is disconnected from the front wheels 76, it is rotated in the reverse direction relative to the moving direction, so that it is possible to stop the front propeller shaft 74. This is advantageous with regard to fuel cost and vibration.

But since the transfer 73 has no synchronizer, in order to change to four wheel drive (4WD), the vehicle has to be stopped.

Also, even if a mechanism for cutting off power is not provided in the transfer 73, by turning OFF current to the electromagnet 58 of the rotation transmission device 50, 2WD travel is possible. But in this case, although it is impossible to stop the front propeller shaft 74, it is possible to change to 4WD travel while the vehicle is running.

During 2WD running in AUTO mode, the controller 82 compares the number of revolutions of the front and rear wheels 76 and 78 with a preset value, and when the number of revolutions of the rear wheels 78 exceeds the preset value, it energizes the electromagnet 58 of the rotation transmission device 50 to lock the two-way clutch 1 and change from 2WD to 4WD.

Figure 13:
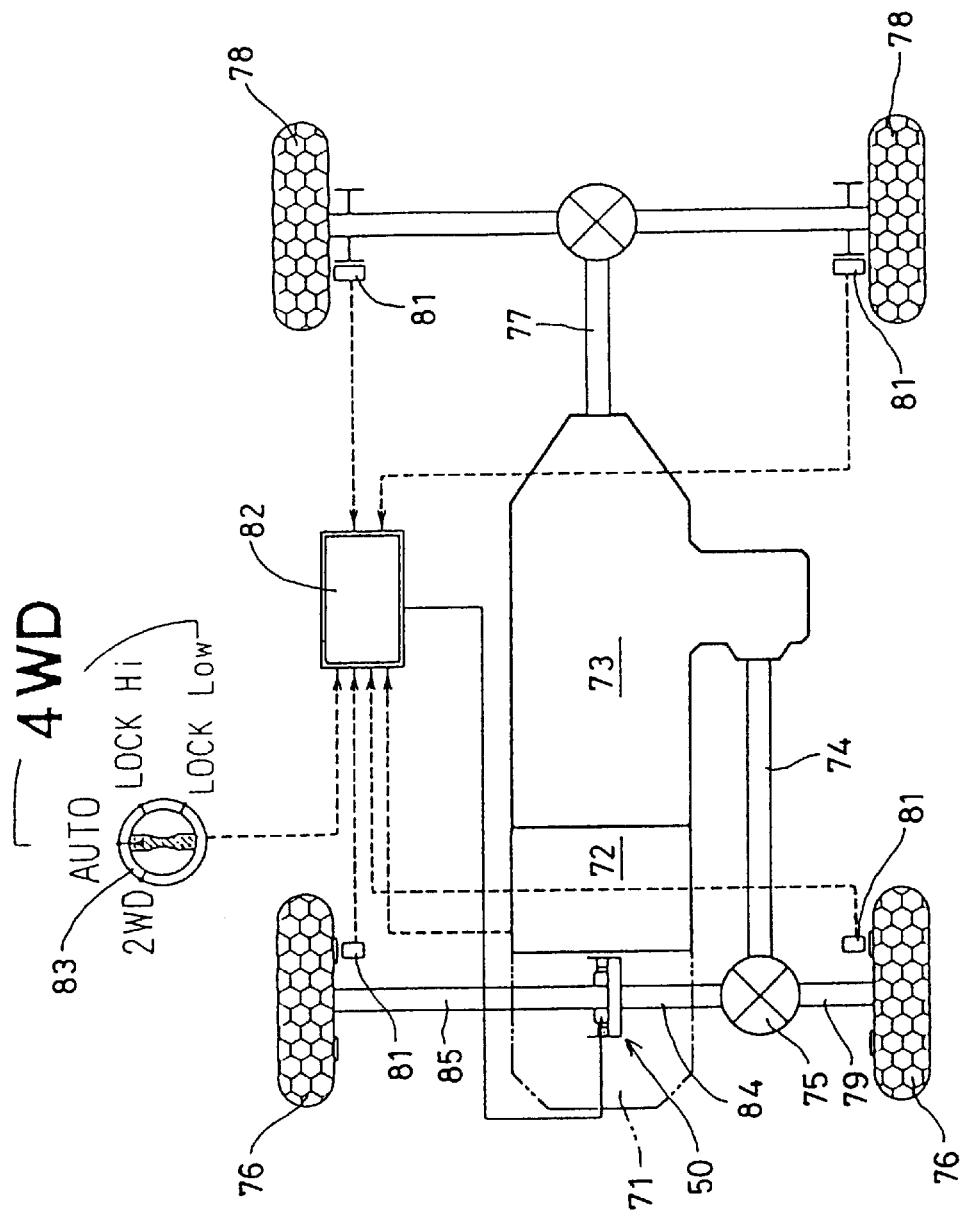
Figure 14:
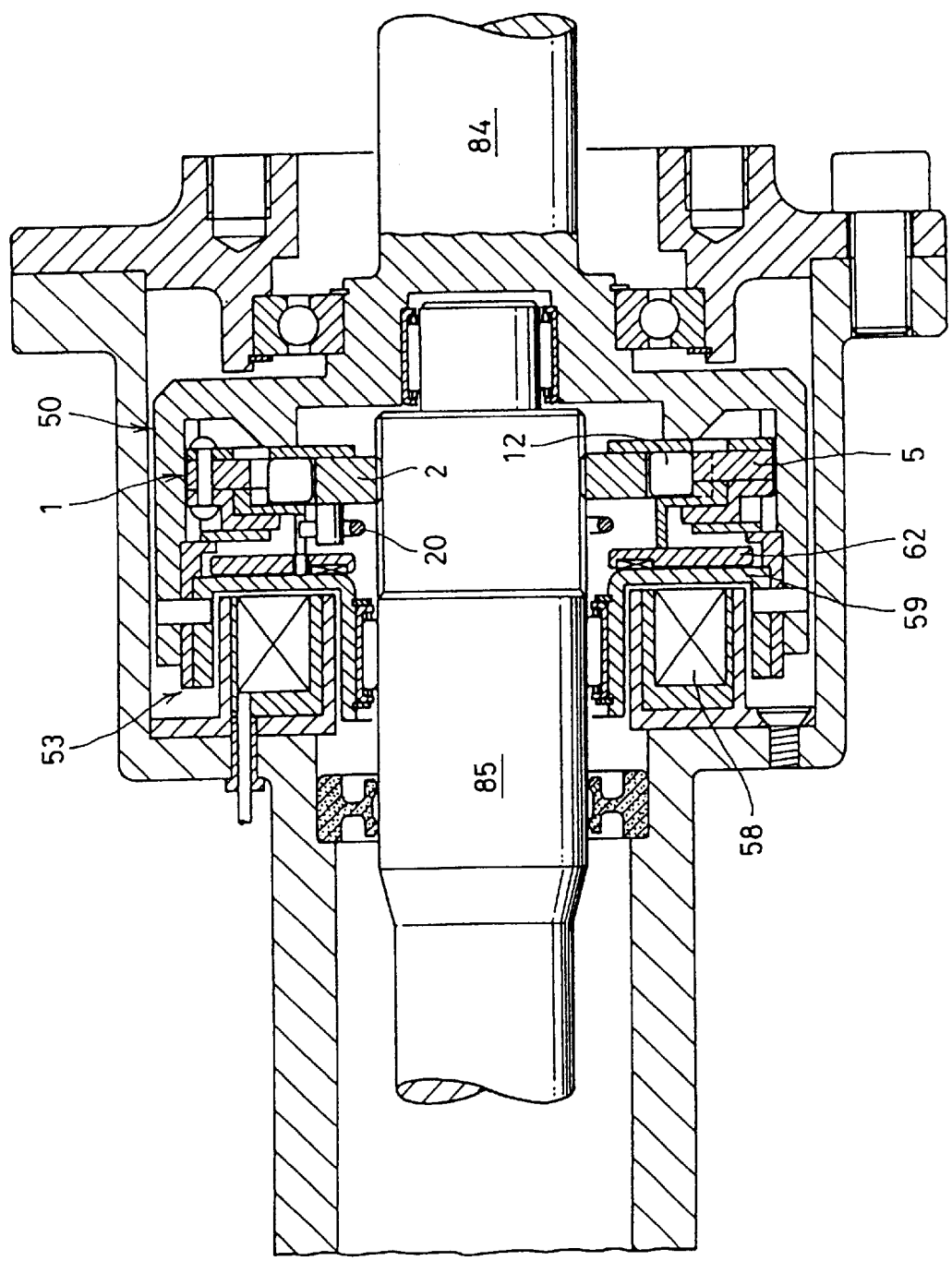

FIG. 13 shows a layout showing a second example in which the rotation transmission device 50 of the first embodiment is used in a wheel drive line of a four-wheel drive vehicle as a rotation transmission device for an axle. FIG. 14 shows a structure of a portion in which the rotation transmission device is mounted.

In the second example, the rotation transmission device 50 is mounted on a front wheel axle 79 branched by a differential 75 in order to drive the right and left wheels from a front propeller shaft 74 of a so-called FR-base four-wheel drive vehicle in which the output from the transfer 73 is transmitted directly to a rear propeller shaft 77 and the power can be branched to the front propeller shaft 74. The rotation transmission device 50 is mounted between an input drive shaft 84 from the differential 75 and an output drive shaft 85 coupled to the front wheel 76.

The control and operation of travel in the vehicle of the layout shown in the second example are the same as in the first example.

Figure 15:
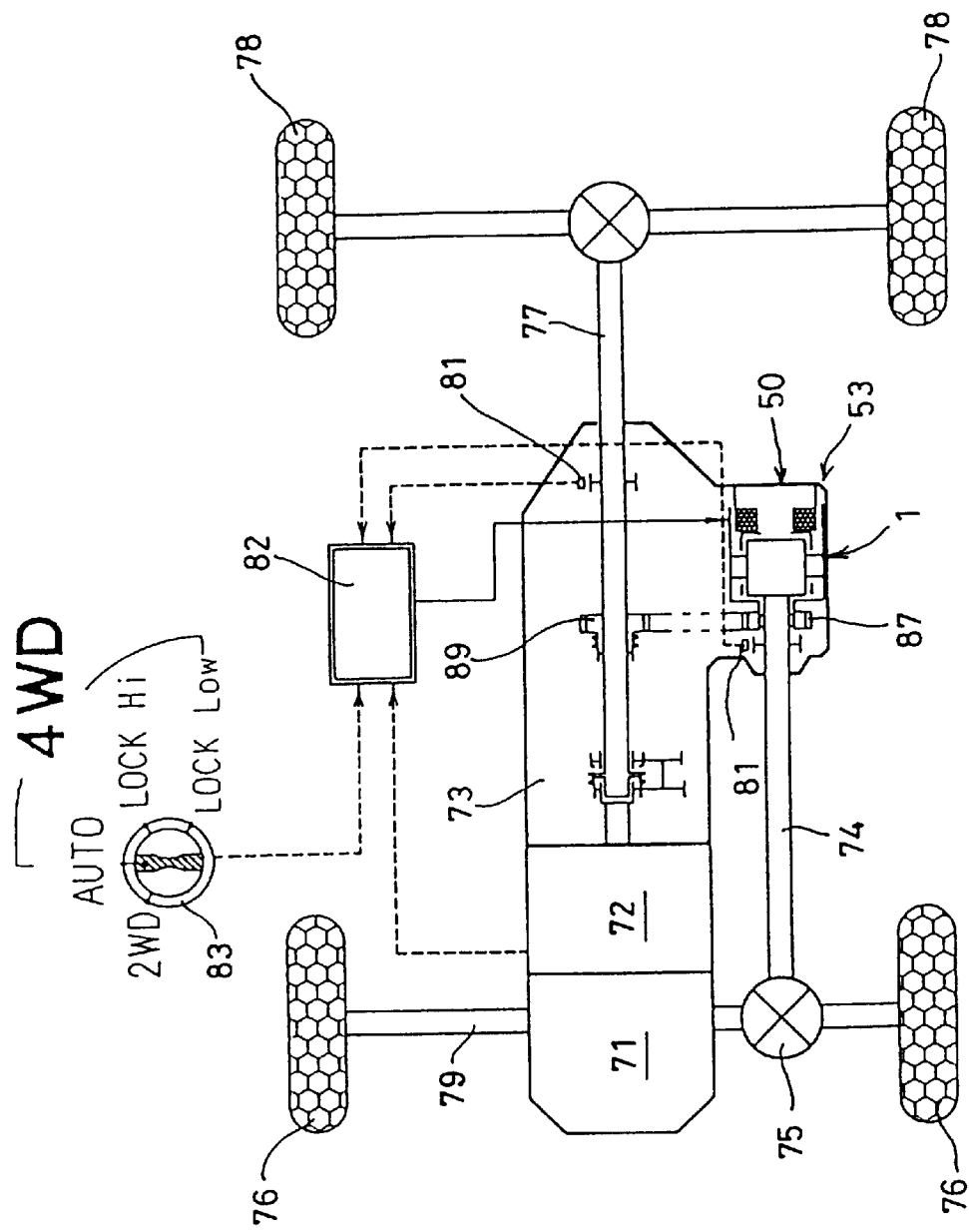
Figure 16:
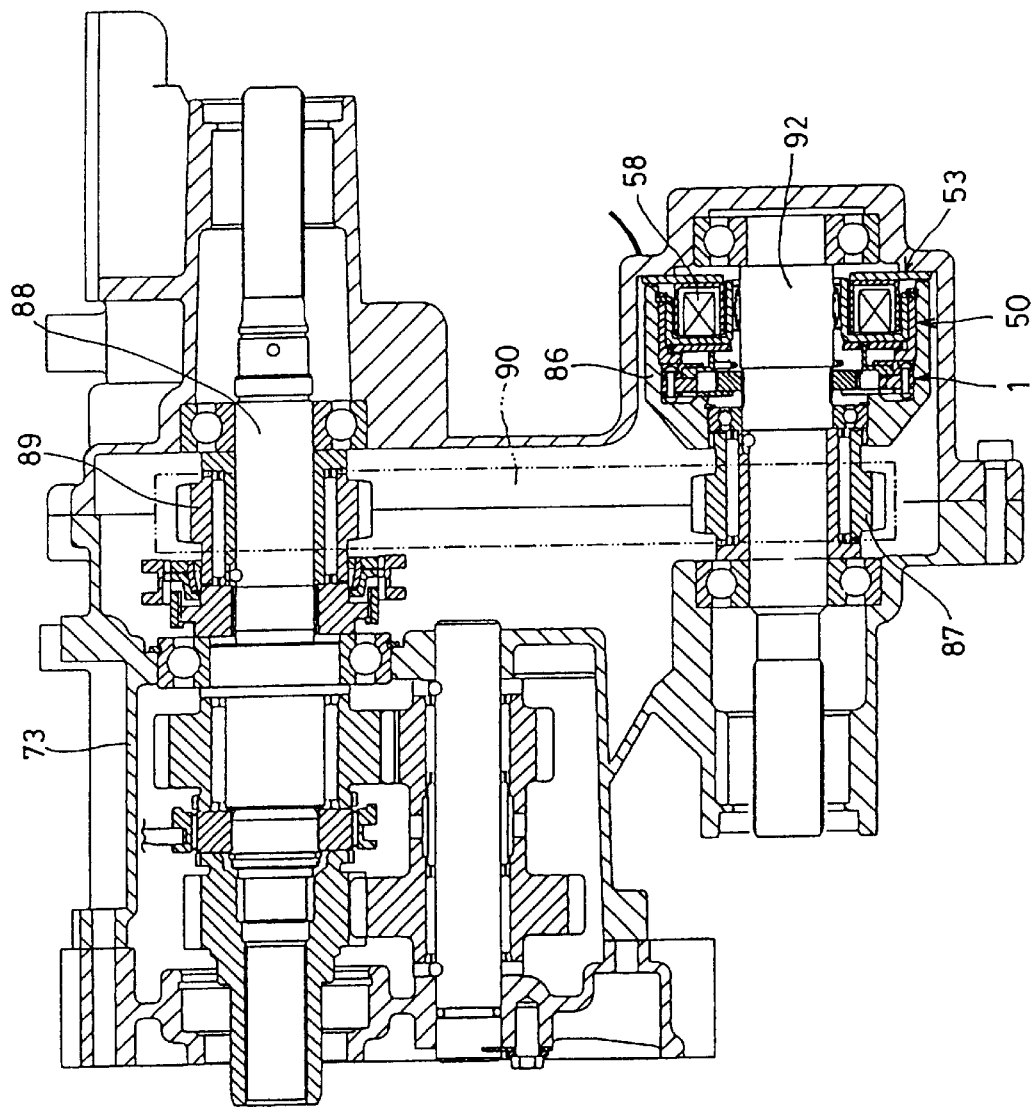

FIG. 15 shows a layout of a third example in which the rotation transmission device 50 of the first embodiment is mounted in a wheel drive line of a four-wheel drive vehicle as a rotation transmission device for a transfer. FIG. 16 shows a structure of a portion in which the rotation transmission device 50 is mounted.

In the third example, the rotation transmission device 50 is mounted on a front propeller shaft 74 in the transfer 73, the inner ring 2 is fixed to the front propeller shaft 74 so as to integrally rotate therewith, and a rotary case 86 fixed so as to integrally rotate with the outer ring 5 is coupled so as to integrally rotate with an input gear 87 rotatably mounted on the front propeller shaft 74. The input gear 87 is associated with an output gear 89 fixed to the input shaft 77 of the transfer 73 by a chain 90.

In the third example, the rotational speed of the input shaft 77 of the transfer 73 and that of the front propeller shaft 74 are detected by sensors 81 and entered into a controller 82. The controller compares the number of revolutions of the front and rear wheels 76 and 78 with a preset value, and when the number of revolutions of the rear wheels 78 exceed the preset value, the electromagnet 88 of the rotation transmission device 50 is energized to lock the two-way clutch 1 and change from 2WD to 4WD.

Since all the elements are formed by pressing, the entire two-way clutch or the rotation transmission device including the two-way clutch which is lightweight and inexpensive can be provided.

In the engaged state, the block members are received in the pockets of the inner and outer rings and work under shear load, a large torque can be transmitted between the inner and outer rings even if the entire size of the clutch is small.

If the number of the pockets of the inner ring is equal to the number of the pockets of the outer ring, a large torque can be transmitted even if the size of the clutch is small. If the numbers differ from each other, the outer and inner rings can be locked together quickly and the engaging angle can be set to be small.

Also, since gaps in the rotational direction are provided in the torque transmitting portions provided between the outer ring and the case, and resilient members are provided at both ends of the torque transmitting portions, it is possible to lock the inner and outer rings together with the cam ring completely disengaged from the block members. Thus, it is possible to extend or protrude the block members reliably into the pockets of the inner and outer rings. Thus, during rotation transmission, the block members will not be removed from the pockets. This is important during rotation transmission in which forward and backward rotations are alternately repeated.

As described above, according to this invention, the two-way clutch is combined with an electromagnetic clutch having its rotor coupled to another rotary member so that the cam ring is engagable with the rotor in response to an external signal delivered to the electromagnetic clutch. By mounting this rotation transmission device in a front wheel drive line of a four-wheel drive vehicle in which the front and rear wheels are directly coupled together, and by controlling coupling and separation of the rotation transmission device, it is possible to automatically change over between 2WD and 4WD. Also, by using a transfer equipped with a synchronizer in combination with the rotation transmission device, it is possible to save fuel cost by stopping the front wheel drive line during 2WD travel, and also it is possible to travel fulltime easily during a 4WD travel.

Also, because the main component parts of the two-way clutch in the rotation transmission device can be formed by pressing and because the standard capacity can be increased by using the block members under shear load, it is possible to provide a new rotation transmission device which can realize reduction in weight, size and cost.

What is claimed is:

1. A two-way clutch comprising:
   a first rotary member having a first annular surface with first pockets therein;
   a second rotary member that is rotatable relative to said first rotary member, said second rotary member having a second annular surface with second pockets therein, with said second annular surface opposing said first annular surface;
   block members, each of said block members received within a corresponding said first pocket;
   resilient members, each of said resilient members received within a corresponding said first pocket to bias a corresponding said block member in a direction from said first annular surface toward said second annular surface and into a corresponding said second pocket; and
   a cam ring having a third annular surface with cam lobes extending therefrom, said third annular surface opposing said first annular surface with said cam lobes being equal in number to that of said block members, said cam ring being rotatable relative to said first rotary member between a first position at which said cam lobes are aligned with said block members to force said block members out of corresponding said second pockets and into corresponding said first pockets against said resilient members, respectively, and a second position at which said cam lobes are not aligned with said block members to allow said resilient members to bias said block members to extend from corresponding said first pockets into corresponding said second pockets, respectively.

2. The two-way clutch according to claim 1, wherein said block members are received within corresponding said first pockets that are spaced at equal angular intervals, and said cam lobes are spaced at equal angular intervals.

3. The two-way clutch according to claim 2, wherein one of said first rotary member and said second rotary member surrounds the other of said first rotary member and said second rotary member such that said first annular surface radially opposes said second annular surface whereby said resilient members are to bias said block members in a radial direction from said first annular surface toward said second annular surface, and wherein said third annular surface radially opposes said first annular surface.

4. The two-way clutch according to claim 3, wherein said first annular surface comprises an outer annular surface of said first rotary member and said second annular surface comprises an inner annular surface of said second rotary member, and said second rotary member surrounds said first rotary member such that said outer annular surface radially opposes said inner annular surface whereby said resilient members are to bias said block members in a radially outward direction from said outer annular surface toward said inner annular surface, and further comprising a switch spring to maintain said cam ring in one of the first position and the second position.

5. The two-way clutch according to claim further comprising a case mounted on said second rotary member, torque transmitting portions between said second rotary member and said case, and gaps extending in said torque transmitting portions in a rotational direction of said second rotary member.

6. The two-way clutch according to claim 4, wherein said first pockets are different in number relative to that of said second pockets.

7. The two-way clutch according to claim 4, wherein said second pockets have an axial width that is slightly smaller than that of said first pockets.

8. The two-way clutch according to claim 2, further comprising a case mounted on said second rotary member, said case having gaps therein that define torque transmitting portions between said second rotary member and said case, wherein gaps extend in a rotational direction of said second rotary member.

9. The two-way clutch according to claim 8, wherein each of said torque transmitting portions has two ends along the rotational direction of said second rotary member, and further comprising a resilient member at each of said ends.

10. The two-way clutch according to claim 9, wherein said first pockets are different in number relative to that of said second pockets.

11. The two-way clutch according to claim 9, wherein said second pockets have a width that is slightly smaller than that of said first pockets.

12. The two-way clutch according to claim 8, wherein said first pockets are different in number relative to that of said second pockets.

13. The two-way clutch according to claim 8, wherein said second pockets have a width that is slightly smaller than that of said first pockets.

14. The two-way clutch according to claim 2, wherein said first pockets are different in number relative to that of said second pockets.

15. The two-way clutch according to claim 14, wherein said second pockets have a width that is slightly smaller than that of said first pockets.

16. The two-way clutch according to claim 2, wherein said second pockets have a width that is slightly smaller than that of said first pockets.

17. The two-way clutch according to claim 1, wherein said first annular surface axially opposes said second annular surface such that said resilient members are to bias said block members in an axial direction from said first annular surface toward said second annular surface, and said third annular surface axially opposes said first annular surface, and further comprising a switch spring to maintain said cam ring in one of the first position and the second position.

18. The two-way clutch according to claim 17, further comprising a case mounted on said second-rotary member, torque transmitting portions between said second rotary member and said case, and gaps extending in said torque transmitting portions in a rotational direction of said second rotary member.

19. The two-way clutch according to claim 17, wherein said first pockets are different in number relative to that of said second pockets.

20. The two-way clutch according to claim 17, wherein said second pockets have a radial width that is slightly smaller than that of said first pockets.

21. The two-way clutch according to claim 1, wherein said first annular surface comprises an inner annular surface of said first rotary member and said second annular surface comprises an outer annular surface of said second rotary member, and said first rotary member surrounds said second rotary member such that said outer annular surface radially opposes said inner annular surface whereby said resilient members are to bias said block members in a radially inward direction from said inner annular surface toward said outer annular surface, and further comprising a switch spring to maintain said cam ring in one of the first position and the second position.

22. The two-way clutch according to claim 21, further comprising a case mounted on said first rotary member, torque transmitting portions between said first rotary member and said case, and gaps extending in said torque transmitting portions in a rotational direction of said first rotary member.

23. The two-way clutch according to claim 21, wherein said first pockets are different in number relative to that of said second pockets.

24. The two-way clutch according to claim 21, wherein said second pockets have an axial width that is slightly smaller than that of said first pockets.

25. The two-way clutch according to claim 1, wherein said first annular surface comprises an outer annular surface of said first rotary member and said second annular surface comprises an inner annular surface of said second rotary member, and said second rotary member surrounds said first rotary member such that said outer annular surface radially opposes said inner annular surface whereby said resilient members are to bias said block members in a radially outward direction from said outer annular surface toward said inner annular surface, and further comprising a switch spring to maintain said cam ring in one of the first position and the second position.

26. The two-way clutch according to claim 25, further comprising a case mounted on said second rotary member, torque transmitting portions between said second rotary member and said case, and gaps extending in said torque transmitting portions in a rotational direction of said second rotary member.

27. The two-way clutch according to claim 25, wherein said first pockets are different in number relative to that of said second pockets.

28. The two-way clutch according to claim 25, wherein said second pockets have an axial width that is slightly smaller than that of said first pockets.

29. A rotation transmission device comprising:
   a first rotary component;
   a second rotary component;
   an electromagnetic clutch coupled to said second rotary component, said electromagnetic clutch including an armature and a rotor; and
   a two-way clutch including
      (i) a first member coupled to said first rotary component, said first member having a first peripheral surface with first pockets therein,
      (ii) a second member mounted on said first member, said second member having a second peripheral surface with second pockets therein,
      (iii) block members, each of said block members received within a corresponding said first pocket,
      (iv) resilient members, each of said resilient members received within a corresponding said first pocket to bias a corresponding said block member in a direction from said first peripheral surface toward said second peripheral surface, and
      (v) a cam ring adjacent said second member, said cam ring having a cam surface facing said first pockets for controlling the protrusion of said plural block members from said first pockets and the retraction of said plural block members into said first pockets, wherein said cam ring is engageable with and disengeable from said rotor in response to an external signal delivered to said electromagnetic clutch.

30. The rotation transmission device according to claim 29, wherein said first peripheral surface comprises an outer peripheral surface of said first member and said second peripheral surface comprises an inner peripheral surface of said second member.

31. The rotation transmission device according to claim 30, wherein said first pockets are different in number relative to that of said second pockets.

32. The rotation transmission device according to claim 31, wherein said second pockets have a width that is slightly smaller than that of said first pockets.

33. The rotation transmission device according to claim 31, wherein said rotation transmission device is mounted between a front wheel axle and a power transmitting portion of a wheel of an FR-base four wheel drive vehicle in which output from a transmission is to be transmitted directly to a rear propeller shaft and power is to be branched to a front propeller shaft, and current to be supplied to an electromagnet of said electromagnetic clutch is to be controlled by a circuit that is wired to the electromagnet for changing operation of the four wheel drive vehicle to and from a two wheel drive mode and a four wheel drive mode.

34. The rotation transmission device according to claim 31, wherein said rotation transmission device is mounted on a front wheel axle that is branched by a differential from a front wheel propeller shaft of an FR-base four wheel drive vehicle in which output from a transmission is to be transmitted directly to a rear propeller shaft and power is to be branched to a front propeller shaft, and current to be supplied to an electromagnet of said electromagnetic clutch is to be controlled by a circuit that is wired to the electromagnet for changing operation of the four wheel drive vehicle to and from a two wheel drive mode and a four wheel drive mode.

35. The rotation transmission device according to claim 31, wherein said rotation transmission device is mounted on a front propeller shaft of a four wheel drive vehicle in which front and rear wheels are directly coupled to each other, and current to be supplied to an electromagnet of said electromagnetic clutch is to be controlled by a circuit that is wired to the electromagnet for changing operation of the four wheel drive vehicle to and from a two wheel drive mode and a four wheel drive mode.

36. The rotation transmission device according to claim 30, wherein said second pockets have a width that is slightly smaller than that of said first pockets.

37. The rotation transmission device according to claim 36, wherein said rotation transmission device is mounted between a front wheel axle and a power transmitting portion of a wheel of an FR-base four wheel drive vehicle in which output from a transmission is to be transmitted directly to a rear propeller shaft and power is to be branched to a front propeller shaft, and current to be supplied to an electromagnet of said electromagnetic clutch is to be controlled by a circuit that is wired to the electromagnet for changing operation of the four wheel drive vehicle to and from a two wheel drive mode and a four wheel drive mode.

38. The rotation transmission device according to claim 36, wherein said rotation transmission device is mounted on a front wheel axle that is branched by a differential from a front wheel propeller shaft of an FR-base four wheel drive vehicle in which output from a transmission is to be transmitted directly to a rear propeller shaft and power is to be branched to a front propeller shaft, and current to be supplied to an electromagnet of said electromagnetic clutch is to be controlled by a circuit that is wired to the electromagnet for changing operation of the four wheel drive vehicle to and from a two wheel drive mode and a four wheel drive mode.

39. The rotation transmission device according to claim 36, wherein said rotation transmission device is mounted on a front propeller shaft of a four wheel drive vehicle in which front and rear wheels are directly coupled to each other, and current to be supplied to an electromagnet of said electromagnetic clutch is to be controlled by a circuit that is wired to the electromagnet for changing operation of the four wheel drive vehicle to and from a two wheel drive mode and a four wheel drive mode.

40. The rotation transmission device according to claim 30, wherein said first member comprises an inner member and said first peripheral surface comprises an outer peripheral surface of said inner member, and said second member comprises an outer member and said second peripheral surface comprises an inner peripheral surface of said outer member such that said resilient members are to bias said block members in a radial direction from said outer peripheral surface toward said inner peripheral surface, wherein said cam surface comprises an inner peripheral surface of said cam ring, and said cam ring and said armature are coupled together so as to be rotatable and axially movable relative to one another, and further comprising:

a switch spring mounted to said inner member for controlling a relative position between said cam ring and said inner member such that said first pockets can become aligned with said second pockets whereby said block members are biased by said resilient members to extend from said first pockets into said second pockets to thereby couple said inner member to said outer member for transmission of power.

41. The rotation transmission device according to claim 40, wherein said first pockets are different in number relative to that of said second pockets.

42. The rotation transmission device according to claim 40, wherein said second pockets have an axial width that is slightly smaller than that of said first pockets.

43. The rotation transmission device according to claim 40, wherein said rotation transmission device is mounted between a front wheel axle and a power transmitting portion of a wheel of an FR-base four wheel drive vehicle in which output from a transmission is to be transmitted directly to a rear propeller shaft and power is to be branched to a front propeller shaft, and current to be supplied to an electromagnet of said electromagnetic clutch is to be controlled by a circuit that is wired to the electromagnet for changing operation of the four wheel drive vehicle to and from a two wheel drive mode and a four wheel drive mode.

44. The rotation transmission device according to claim 40, wherein said rotation transmission device is mounted on a front wheel axle that is branched by a differential from a front wheel propeller shaft of an FR-base four wheel drive vehicle in which output from a transmission is to be transmitted directly to a rear propeller shaft and power is to be branched to a front propeller shaft, and current to be supplied to an electromagnet of said electromagnetic clutch is to be controlled by a circuit that is wired to the electromagnet for changing operation of the four wheel drive vehicle to and from a two wheel drive mode and a four wheel drive mode.

45. The rotation transmission device according to claim 40, wherein said rotation transmission device is mounted on a front propeller shaft of a four wheel drive vehicle in which front and rear wheels are directly coupled to each other, and current to be supplied to an electromagnet of said electromagnetic clutch is to be controlled by a circuit that is wired to the electromagnet for changing operation of the four wheel drive vehicle to and from a two wheel drive mode and a four wheel drive mode.

46. The rotation transmission device according to claim 30, wherein said first member comprises an outer member and said first peripheral surface comprises an inner peripheral surface of said outer member, and said second member comprises an inner member and said second peripheral surface comprises an outer peripheral surface of said inner member such that said resilient members are to bias said block members in a radial direction from said inner peripheral surface toward said outer peripheral surface, wherein said cam surface comprises an outer peripheral surface of said cam ring, and said cam ring and said armature are coupled together so as to be rotatable and axially movable relative to one another, and further comprising:

a switch spring mounted to said inner member for controlling a relative position between said cam ring and said inner member such that said first pockets can become aligned with said second pockets whereby said block members are biased by said resilient members to extend from said first pockets into said second pockets to thereby couple said inner member to said outer member for transmission of power.

47. The rotation transmission device according to claim 46, wherein said first pockets are different in number relative to that of said second pockets.

48. The rotation transmission device according to claim 46, wherein said second pockets have an axial width that is slightly smaller than that of said first pockets.

49. The rotation transmission device according to claim 46, wherein said rotation transmission device is mounted between a front wheel axle and a power transmitting portion of a wheel of an FR-base four wheel drive vehicle in which output from a transmission is to be transmitted directly to a rear propeller shaft and power is to be branched to a front propeller shaft, and current to be supplied to an electromagnet of said electromagnetic clutch is to be controlled by a circuit that is wired to the electromagnet for changing operation of the four wheel drive vehicle to and from a two wheel drive mode and a four wheel drive mode.

50. The rotation transmission device according to claim 46, wherein said rotation transmission device is mounted on a front wheel axle that is branched by a differential from a front wheel propeller shaft of an FR-base four wheel drive vehicle in which output from a transmission is to be transmitted directly to a rear propeller shaft and power is to be branched to a front propeller shaft, and current to be supplied to an electromagnet of said electromagnetic clutch is to be controlled by a circuit that is wired to the electromagnet for changing operation of the four wheel drive vehicle to and from a two wheel drive mode and a four wheel drive mode.

51. The rotation transmission device according to claim 46, wherein said rotation transmission device is mounted on a front propeller shaft of a four wheel drive vehicle in which front and rear wheels are directly coupled to each other, and current to be supplied to an electromagnet of said electromagnetic clutch is to be controlled by a circuit that is wired to the electromagnet for changing operation of the four wheel drive vehicle to and from a two wheel drive mode and a four wheel drive mode.

52. The rotation transmission device according to claim 29, wherein said first member comprises an inner member and said first peripheral surface comprises an axially facing peripheral surface of said inner member, and said second member comprises an outer member and said second peripheral surface comprises an axially facing peripheral surface of said outer member such that said resilient members are to bias said block members in an axial direction from said first peripheral surface toward said second peripheral surface, wherein said cam surface comprises an axially facing peripheral surface of said cam ring, and said cam ring and said armature are coupled together so as to be rotatable and axially movable relative to one another, and further comprising:

a switch spring mounted to said inner member for controlling a relative position between said cam ring and said inner member such that said first pockets can become aligned with said second pockets whereby said block members are biased by said resilient members to extend from said first pockets into said second pockets to thereby couple said inner member to said outer member for transmission of power.

53. The rotation transmission device according to claim 52, wherein said first pockets are different in number relative to that of said second pockets.

54. The rotation transmission device according to claim 52, wherein said second pockets have a radial width that is slightly smaller than that of said first pockets.

55. The rotation transmission device according to claim 52, wherein said rotation transmission device is mounted between a front wheel axle and a power transmitting portion of a wheel of an FR-base four wheel drive vehicle in which output from a transmission is to be transmitted directly to a rear propeller shaft and power is to be branched to a front propeller shaft, and current to be supplied to an electromagnet of said electromagnetic clutch is to be controlled by a circuit that is wired to the electromagnet for changing operation of the four wheel drive vehicle to and from a two wheel drive mode and a four wheel drive mode.

56. The rotation transmission device according to claim 53, wherein said rotation transmission device is mounted on a front wheel axle that is branched by a differential from a front wheel propeller shaft of an FR-base four wheel drive vehicle in which output from a transmission is to be transmitted directly to a rear propeller shaft and power is to be branched to a front propeller shaft, and current to be supplied to an electromagnet of said electromagnetic clutch is to be controlled by a circuit that is wired to the electromagnet for changing operation of the four wheel drive vehicle to and from a two wheel drive mode and a four wheel drive mode.

57. The rotation transmission device according to claim 52, wherein said rotation transmission device is mounted on a front propeller shaft of a four wheel drive vehicle in which front and rear wheels are directly coupled to each other, and current to be supplied to an electromagnet of said electromagnetic clutch is to be controlled by a circuit that is wired to the electromagnet for changing operation of the four wheel drive vehicle to and from a two wheel drive mode and a four wheel drive mode.

58. The rotation transmission device according to claim 30, wherein said rotation transmission device is mounted on a front propeller shaft of a four wheel drive vehicle in which front and rear wheels are directly coupled to each other, and current to be supplied to an electromagnet of said electromagnetic clutch is to be controlled by a circuit that is wired to the electromagnet for changing operation of the four wheel drive vehicle to and from a two wheel drive mode and a four wheel drive mode.

59. The rotation transmission device according to claim 58, wherein the circuit for changing operation of the four wheel drive vehicle is to change operation from the two wheel drive mode to the four wheel drive mode by delivering the current to the electromagnet when the number of revolutions of a rear wheel as detected by a sensor is greater than a preset value.

60. The rotation transmission device according to claim 58, wherein the circuit for changing operation of the four wheel drive vehicle is to change operation from the two wheel drive mode to the four wheel drive mode by delivering the current to the electromagnet, and is to change operation from the four wheel drive mode to the two wheel drive mode by interrupting the flow of current to the electromagnet.

61. The rotation transmission device according to claim 29, wherein said rotation transmission device is mounted between a front wheel axle and a power transmitting portion of a wheel of an FR-base four wheel drive vehicle in which output from a transmission is to be transmitted directly to a rear propeller shaft and power is to be branched to a front propeller shaft, and current to be supplied to an electromagnet of said electromagnetic clutch is to be controlled by a circuit that is wired to the electromagnet for changing operation of the four wheel drive vehicle to and from a two wheel drive mode and a four wheel drive mode.

62. The rotation transmission device according to claim 61, wherein the circuit for changing operation of the four wheel drive vehicle is to change operation from the two wheel drive mode to the four wheel drive mode by delivering the current to the electromagnet, and is to change operation from the four wheel drive mode to the two wheel drive mode by interrupting the flow of current to the electromagnet.

63. The rotation transmission device according to claim 61, wherein the circuit for changing operation of the four wheel drive vehicle is to change operation from the two wheel drive mode to the four wheel drive mode by delivering the current to the electromagnet when the number of revolutions of a rear wheel as detected by a sensor is greater than a preset value.

64. The rotation transmission device according to claim 29, wherein said rotation transmission device is mounted on a front wheel axle that is branched by a differential from a front wheel propeller shaft of an FR-base four wheel drive vehicle in which output from a transmission is to be transmitted directly to a rear propeller shaft and power is to be branched to a front propeller shaft, and current to be supplied to an electromagnet of said electromagnetic clutch is to be controlled by a circuit that is wired to the electromagnet for changing operation of the four wheel drive vehicle to and from a two wheel drive mode and a four wheel drive mode.

65. The rotation transmission device according to claim 64, wherein the circuit for changing operation of the four wheel drive vehicle is to change operation from the two wheel drive mode to the four wheel drive mode by delivering the current to the electromagnet when the number of revolutions of a rear wheel as detected by a sensor is greater than a preset value.

66. The rotation transmission device according to claim 64, wherein the circuit for changing operation of the four wheel drive vehicle is to change operation from the two wheel drive mode to the four wheel drive mode by delivering the current to the electromagnet, and is to change operation from the four wheel drive mode to the two wheel drive mode by interrupting the flow of current to the electromagnet.

* * * * *